(12) United States Patent
Wells

(10) Patent No.: US 7,663,074 B2
(45) Date of Patent: Feb. 16, 2010

(54) METHOD AND APPARATUS FOR SECURING WELDING TORCH COMPONENTS

(75) Inventor: Jeff G. Wells, Old Castle (CA)

(73) Assignee: Illinois Tool Works Inc., Glenview, IL (US)

( * ) Notice: Subject to any disclaimer, the term of this patent is extended or adjusted under 35 U.S.C. 154(b) by 235 days.

(21) Appl. No.: 11/094,835

(22) Filed: Mar. 30, 2005

(65) Prior Publication Data

US 2005/0218132 A1 Oct. 6, 2005

Related U.S. Application Data

(63) Continuation-in-part of application No. 10/916,031, filed on Aug. 11, 2004, now Pat. No. 7,176,412.

(60) Provisional application No. 60/558,236, filed on Mar. 31, 2004.

(51) Int. Cl.
*B23K 9/28* (2006.01)
(52) U.S. Cl. .................. 219/137.31; 219/138
(58) Field of Classification Search .......... 219/137.31, 219/137.42, 137.52, 137.61, 137.62, 138
See application file for complete search history.

(56) References Cited

U.S. PATENT DOCUMENTS

| | | | | | |
|---|---|---|---|---|---|
| 2,468,807 | A | * | 5/1949 | Herbst | .......................... 219/75 |
| 2,761,049 | A | | 8/1956 | McElrath et al. | |
| 2,784,294 | A | * | 3/1957 | Gravert | ........................ 219/75 |
| 3,007,033 | A | | 10/1961 | Newman et al. | |
| 3,469,070 | A | | 9/1969 | Bernard et al. | |
| 3,541,298 | A | * | 11/1970 | Carkhuff | ............... 219/137.63 |
| 3,783,233 | A | * | 1/1974 | dal Molin | .............. 219/137.61 |
| 3,944,781 | A | | 3/1976 | Urbanic et al. | |
| 4,105,891 | A | * | 8/1978 | Hill et al. | ............... 219/137.43 |
| 4,145,595 | A | * | 3/1979 | Keller et al. | .................. 219/75 |
| 4,147,920 | A | | 4/1979 | Merrick et al. | |
| 4,282,419 | A | | 8/1981 | Auer | |
| 4,582,979 | A | | 4/1986 | Moerke | |
| 4,675,493 | A | | 6/1987 | Gartland et al. | |
| 4,680,440 | A | | 7/1987 | Barlet | |
| 4,801,780 | A | | 1/1989 | Hayes | |

(Continued)

FOREIGN PATENT DOCUMENTS

CA 2344142 3/2000

OTHER PUBLICATIONS

International Search Report for PCT Application No. PCT/IB2005/000836 mailed on Aug. 2, 2005.

*Primary Examiner*—Kevin P Kerns
(74) *Attorney, Agent, or Firm*—Fletcher Yoder

(57) ABSTRACT

A method and apparatus for using a collet to align and/or axially secure a liner within the gooseneck of a welding torch and to extend the useful life of the torch components are provided. A method and apparatus for securing torch components including said collet and including tapered locking engagement connections are also provided. A position of the liner with respect to a retaining head or a diffuser can be established and maintained, in spite of bending, swiveling, and other general movement of the torch, while still allowing flow of a shield gas past the collet. The welding torch components, including a gas diffuser, can be secured to the torch or other torch components via tapered locking engagements. The invention is useful for both manual and robotic torch systems.

18 Claims, 16 Drawing Sheets

U.S. PATENT DOCUMENTS

| | | |
|---|---|---|
| 5,258,599 A | 11/1993 | Moerke |
| 5,338,917 A | 8/1994 | Stuart et al. |
| 5,491,321 A | 2/1996 | Stuart et al. |
| 5,726,420 A | 3/1998 | Lajoie |
| 5,798,493 A | 8/1998 | Heller, Sr. |
| 5,844,201 A | 12/1998 | Dibacco et al. |
| 5,911,894 A | 6/1999 | Colling |
| 5,916,464 A | 6/1999 | Geiger |
| 6,051,806 A | 4/2000 | Shikata et al. |
| 6,075,227 A | 6/2000 | Lajoie |
| 6,307,179 B1 | 10/2001 | Walters, III |
| 6,559,416 B1 | 5/2003 | Steenis et al. |
| 6,689,987 B2 | 2/2004 | Altekruse et al. |
| 6,720,528 B1 * | 4/2004 | Matiash et al. ......... 219/137.31 |
| 6,884,958 B2 | 4/2005 | Samler |
| 6,888,092 B2 | 5/2005 | Walters |
| 6,987,237 B2 | 1/2006 | Walters |
| 6,995,331 B2 | 2/2006 | Samler |
| 7,176,412 B2 * | 2/2007 | Wells ................... 219/137.61 |
| 2004/0074887 A1 | 4/2004 | Matiash et al. |

* cited by examiner

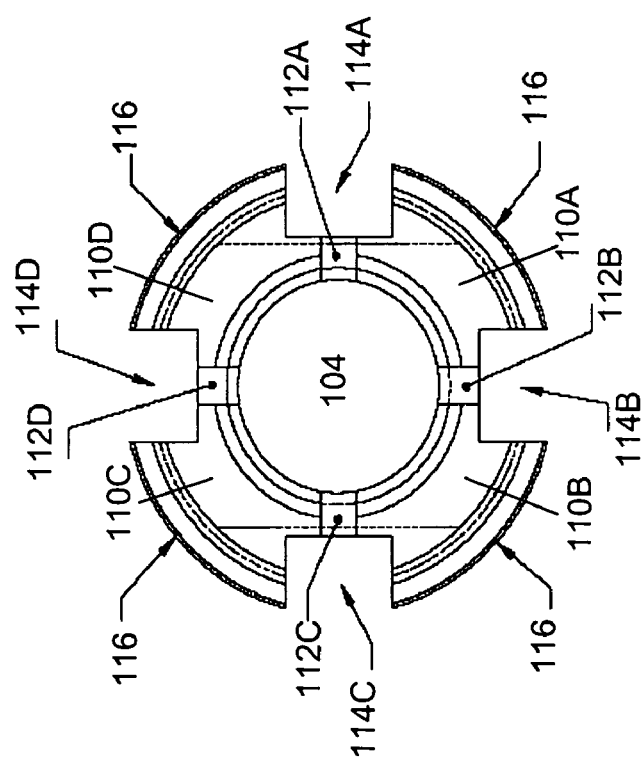
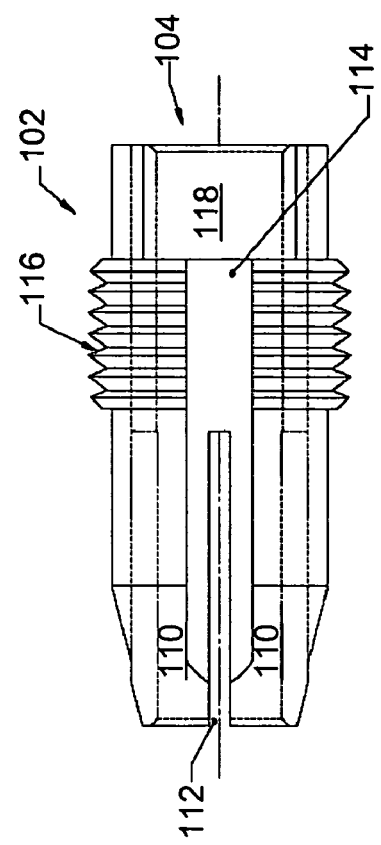
FIG. 9
FIG. 10

METHOD AND APPARATUS FOR SECURING WELDING TORCH COMPONENTS

CROSS REFERENCES TO RELATED APPLICATIONS

This application is a continuation-in-part of U.S. Utility patent application Ser. No. 10/916,031 filed on Aug. 11, 2004, which claims the benefit of U.S. Provisional Application No. 60/558,236 filed on Mar. 31, 2004, and issued as U.S. Pat. No. 7,176,412, the disclosures of which are hereby incorporated herein by reference.

TECHNICAL FIELD

The invention relates generally to components used in welding torches, and more particularly to a method and apparatus for aligning and/or securing components in Metal Inert Gas ("MIG") welding torches.

BACKGROUND

Gas metal arc welding torches, including metal inert gas ("MIG") torches, are widely used to weld metallic materials. A welding torch is designed to allow a user or robot to direct a metal welding wire toward a specific location on a target metal workpiece. As illustrated in FIG. 1, the components of a known welding torch include a handle 12, a gooseneck 14 (sometimes called a mounting tube or a conducting tube), a retaining head 16, a contact tip 18, and a nozzle 20. In some MIG torches, a diffuser is employed rather than a retaining head. The welding torch can be connected to a robotic arm via a mount, 22, or it can be hand held and trigger operated. A welding wire is fed through the handle of the welding torch and ultimately through a passageway in the contact tip, which is disposed at a proximal end of the welding torch. The welding wire is consumed as the welding process progresses and is replenished from a distal wire spool. The welding wire and workpiece material are melted and combined in a molten welding pool.

Referring now to FIG. 2, in a conventional MIG welding torch, a liner 24 passes through a channel 28 within the gooseneck 14 towards the retaining head 16. The liner 24 is secured, if at all, by the longitudinal pressure of the liner 24 against the retaining head 16. Since the liner 24 is relatively long compared to the other components, the precise liner 24 length required to achieve a desired longitudinal positioning pressure against the retaining head occurs only by happenstance and is thus very unlikely.

Referring to FIG. 3, a shield gas used during torch operation typically flows toward the retaining head through an annular space 30 that is located between the gooseneck 14 and the liner 24. The shield gas passes out of the retaining head 16 through at least one vent hole 34 and exits the torch through the nozzle 20. The precise proximal longitudinal termination point of liner 24 generally is uncertain and not repeatable. This uncertainty results in radial and longitudinal motion of the liner 24 during torch operation, causing abrasion and premature wear of the liner 24, the retaining head 16, and other adjacent parts. Additional axial motion of the liner 24 is also caused by thermal expansion and contraction of the torch components as the torch head heats and cools with cyclical usage.

One known method to overcome these problems is illustrated in FIG. 4. A set screw 45 can be used to secure the liner 24 to an inside wall of the retaining head 16 or gooseneck 14. Although this tends to reduce the movement of the liner 24, the liner 24 is not axially centered within the gooseneck 14 or the retaining head 16. As the set screw 45 is tightened, establishing and maintaining a longitudinal termination point of the liner 24 becomes difficult. Even after the liner 24 is secured, this method does not adequately prevent longitudinal movement of the liner 24 as the torch is moved and does not properly maintain alignment of the liner 24. Accordingly, excessive abrasion occurs as the weld wire passes through the proximal end of the liner 24, the gooseneck 14, and/or the retaining head 16, which tends to damage components of the welding torch, including the contact tip 18.

The components of a welding torch typically have screw threads for attachment to the welding torch or other components. Unfortunately, these threaded connections tend to loosen as the welding torch is used, requiring users to stop welding to re-tighten these connections, resulting in down time and losses in efficiency and productivity. In addition, loose connections can be a source of electrical resistance that generates excessive heat within a welding torch. Heat in welding torches translates into shorter consumable life, contact tip burn back, and even melting of components.

SUMMARY

To overcome these problems, what is needed is a way to secure a liner within a torch after the liner is positioned within a torch head but without blocking the flow of shield gas that flows about the liner, e.g., in the annular space between the liner and the gooseneck, through the retaining head, and to the molten welding pool. A longitudinal position of the liner with respect to the retaining head needs to be maintained even as the torch is moved about the workpiece, accommodating the bending, swiveling, and other general movement of the torch. Further, what is also needed is a way to ensure that the component that secures the liner with respect to the torch head can be secured in a way that strengthens threaded connections of and to other torch components thereby reducing electrical resistance and heat.

In preferred embodiments, not only does the longitudinal or axial movement of the liner need to be fixed, but the radial positioning of the liner, e.g., within the gooseneck, the retaining head, or the diffuser, needs to be established and maintained, to minimize the wear of the torch parts from passage of the welding wire therethrough. These objectives should be accomplished without unduly increasing the complexity of the torch head components.

One aspect of the invention overcomes these problems using a collet to radially center the liner within the gooseneck, and/or to center the liner within the retaining head or the diffuser. The collet of the invention can also secure the liner, e.g., within the proximal end of the gooseneck, to reduce wear and abrasion of the torch components by reducing longitudinal and radial motion of the liner within the torch without blocking shield gas flow. Embodiments include different types of collets, including single and multi-piece collet systems. Some embodiments include collets with at least one set of external threads. Other embodiments include collets lacking external threads on at least a portion of the collet.

Further, the invention in various embodiments incorporates locking engagement connections (also referred to as "taper locking features" and "tapers") between the various components of a welding device to ensure that the components remain engaged during operation. For example, a locking engagement connection can be incorporated between a nozzle and a retaining head or a nozzle retainer (i.e., when used with a diffuser) A taper can be incorporated between a retaining head or diffuser and a gooseneck. Tapers can also be employed between a liner collet and a gooseneck. Taper locking features can be used between a liner collet and a retaining head or a diffuser. Locking engagement connections can also be incorporated between a contact tip and a retaining head or diffuser. In some embodiments, various components include more than one tapered locking engagement in combination. Tapered connections can improve and extend the useful life of the components by more securely attaching the components to each other or to the welding device. This reduces the likelihood of overheating and improves heat transfer and electrical conductivity between components. A welding device employing principles of the invention can utilize a single taper between two components, or a combination of two or more tapers can be used.

In some embodiments of the invention, a welding device utilizes two locking engagement connections, each with a different angle between its respective components. Thus, one locking engagement connection can engage with a different amount of clamping or retention force than the other locking engagement connection. As a result, one of the connections can have a tendency to disengage before the other when a force (e.g., a loosening force or a loosening torque) is provided. In some applications, this can be advantageous because a more accessible connection can be configured to come apart before a less accessible connection.

One aspect of the invention features a collet for securing a liner within a gooseneck of a welding torch. The collet includes a hollow body that defines a central passage along a longitudinal axis therethrough and a compression region disposed relative to a distal end of the body. At least one gas passageway is disposed relative to a longitudinal surface of the body, providing a gas flow path between the distal end and a proximal end of the hollow body. The collet also includes at least one surface accessible from the proximal end of the body for securing the body within the gooseneck. The compression region can include at least one compression slot, and the compression slot can be defined by compression fingers. These one or more fingers can be separated by the compression slot, and a plurality of adjacent fingers can be spaced to define a plurality of compression slots. Some embodiments include only one compression slot defined by one compression finger. Tightening the collet (e.g., into the end of a gooseneck) can reduce a width of the compression slot, thereby providing a compressive force on the liner.

The compression region can also be resilient and have a circumference and a diameter. Such embodiments do not require a compression slot or compression fingers. In such embodiments, radial force from contact with the gooseneck can provide a compressive force to secure the liner within the torch. The compression region can be integrally formed with the body. In some embodiments, the collet can include a locking nut. The collet can be an integral assembly manufactured from a metallic material, or from a polymeric material, such as a polyimide.

The hollow body of the collet can include at least one set of exterior threads for engaging a corresponding set of interior threads on the gooseneck. The collet can include a second set of exterior threads for engaging a retaining head, a diffuser, or a contact tip. In such embodiments, the second set of external threads can be at a different pitch than the first set of external threads. In some embodiments, the collet includes an internal gas passageway. The gas passageway can be defined by the exterior surface of the hollow body. The gas passageway can be defined such that it is an open channel, which can pass through the exterior threads in a direction substantially parallel with the longitudinal axis.

The compression region can include a tapered surface adapted for locking engagement with a corresponding tapered surface of the gooseneck. The collet can include a first set of exterior threads and a second set of exterior threads. The collet can include a second tapered surface adapted for locking engagement with a corresponding tapered surface of a retaining head, a diffuser, or a contact tip. The collet can also include at least one surface defined by an exterior surface at the proximal end of the body, e.g., used to apply torque to the collet. This at least one torquing surface can also be defined by an interior surface at the proximal end of the body. The collet can also include a locking nut, e.g., to secure the collet. When a locking nut is used, the hollow body can include exterior threads, but this is not required. The locking nut can include gas passageways, but it can have a different number of gas passageways than the hollow body. The gas passageways of the locking nut are not required to align with the gas passageways of the hollow body when the locking nut and the hollow body of the collet are secured to (e.g., tightened or threaded) the gooseneck of a welding torch.

Another aspect of the invention features a collet for securing a liner within a gooseneck of a welding torch, the collet comprising a hollow body that defines a central passage along a longitudinal axis therethrough, and that has at least one set of external securing threads. The collet can include at least one compression finger that defines at least one compression slot. The compression slot can be disposed relative to a distal end of the body. The collet can also include at least one gas passageway defined by the exterior surface of the hollow body, which can be defined to be an open channel disposed along an exterior surface of the body. The gas passageway can pass through the securing threads and provides for a flow of the shielding gas between the distal end and the proximal end of the body. The collet can also include at least one surface accessible from the proximal end of the body, e.g., to which a torque can be applied, for securing (e.g., tightening) the collet within the gooseneck or for removing the collet from the gooseneck.

The compression slot of the collet can have a width that is reduced when the body is tightened, and the collet can be an integral assembly, e.g., manufactured from a metallic material. The at least one surface for securing the body can be defined by an exterior surface and/or an interior surface disposed relative to the proximal end of the body.

Another aspect of the invention is a method for positioning a liner with respect to a retaining head of a welding torch The method can include the steps of providing a collet, passing the liner through a central passage of the collet to establish a position of the liner with respect to the collet and establishing the liner position with respect to a gooseneck by securing the collet to the gooseneck. The method can include the step of positioning a tapered surface of the collet in contact with a corresponding tapered surface of the gooseneck for locking engagement. The method can include securing the collet to the gooseneck by engaging a first set of external threads on the collet to a threaded region of the gooseneck. The method can include securing the retaining head or the diffuser to the gooseneck or the collet. The retaining head or the diffuser can connect to the collet in a tapered locking engagement. In such an embodiment, connecting the retaining head or diffuser to the collet includes engaging a threaded region of the retaining head or diffuser with a threaded region of the gooseneck or to a second set of external threads of the collet.

The establishing step can include centering the liner with respect to the gooseneck and can axially constrain the liner. The collet for this method can include a hollow body that defines a central passage along a longitudinal axis therethrough, and that has at least one set of external securing threads. It can also include a compression region that comprises at least one compression slot, which is defined by compression fingers which are disposed relative to a distal end of the body. At least one gas passageway can be defined by an exterior surface of the hollow body to be an open channel disposed along the exterior surface of the body, the gas passageway passing through the securing threads and providing for a gas flow between the distal end and the proximal end of the body. The collet can also have at least one surface accessible from the proximal end of the body for applying a torque to secure the body within the gooseneck. In such an embodiment, the compression region can include a first tapered surface adapted for locking engagement with a tapered surface of a first component. In a particular embodiment, the first component in such a configuration is the gooseneck.

Yet another aspect of the invention features a method of manufacturing a collet that includes providing a hollow body that defines a central passage along a longitudinal axis therethrough, and the body can include at least one set of external securing threads. At least one compression finger can be formed relative to a distal end of the body, and a gas passageway can be established along an exterior surface of the hollow body between the distal end and a proximal end of the body, such that the gas passageway can pass through the securing threads. A securing structure can be formed at the proximal end of the body, such that the securing structure can be used, e.g., to apply a torque to cause the at least one compression finger to secure the distal end of the collet to a liner when the proximal end is installed, e.g., tightened, within and engages a gooseneck. The at least one compression finger can define a compression slot, and the gas passageway can be an open channel disposed along the exterior surface. The method can include providing a first tapered surface adapted for locking engagement with a corresponding tapered surface of a first component. In a particular embodiment, the first tapered surface can be defined by the compression region or finger, and the first component can include a gooseneck.

In another aspect of the invention, a welding torch that includes a torch body having a handle and a gooseneck and a liner that passes through the gooseneck and to a retaining head is provided. The torch includes a collet that can include a hollow body defining a central passage, along which a longitudinal axis passes. A compression region defines at least one compression slot that is disposed relative to a distal end of the hollow body, and at least one gas passageway is disposed along an exterior surface of the hollow body, providing for the flow of a gas between the distal end and the proximal end of the hollow body. At least one surface is accessible from the proximal end of the hollow body, for securing the hollow body within the gooseneck, e.g., by application of a torque. Other types of force could be used, such as a longitudinal insertion force (e.g., from a hammer) that would force the collet into the gooseneck, thereby securing the liner position. Whether the applied force is a torque, is purely longitudinal, or is some combination of these, tightening the collet can fix a position of the liner with respect to the gooseneck, without blocking the gas passageway. In one embodiment, the compression region can include a first tapered surface for lockingly engaging a tapered surface of a first component. In such an embodiment, the first component can be a gooseneck. The compression region can include a compression slot defined by at least one compression finger, and the collet can be an integral assembly formed from a metallic material, or a polymeric material such as a polyimide. The at least one surface for securing the hollow body of the collet can be defined by an exterior surface disposed relative to the proximal end of the hollow body or with respect to a proximal end of an optional tightening nut.

In one aspect, the invention features a welding device that can include a first locking engagement connection disposed between a first component and a second component with the first locking engagement connection including a first tapered portion defining first included angle. The welding device can also include a second locking engagement connection disposed between the second component and a third component with the second locking engagement connection including a second tapered portion defining a second included angle. The second included angle can be smaller than the first included angle. Upon application of a force (e.g., a torquing force) between the first component and the third component, the first locking engagement connection can adjust before the second locking engagement connection adjusts. The first component can include a contact tip. In such an embodiment, the second component can include a retaining head, a diffuser, or a collet.

In some embodiments, the third component can include a gooseneck or a collet. The welding device can also include a third locking engagement connection between a nozzle and the retaining head, gooseneck or nozzle retainer. A tapered locking engagement can arise at the interface between the collet and the gooseneck, between the collet and the retaining head or diffuser, between the gooseneck and the retaining head or between the retaining head or nozzle retainer and the nozzle. The first component can include a contact tip, and the second component can include a diffuser. The third component can include a gooseneck or a collet. The welding device can feature a third locking engagement between the diffuser and the collet.

In various embodiments, the first locking engagement connection can engage with a clamping force different than (e.g., greater than) a clamping force of the second locking engagement connection. The first locking engagement connection can disengage before the second locking engagement connection upon application of a loosening force. In one detailed embodiment, the first included angle can be about 20° and the second included angle can be about 12°. In various embodiments, either the first locking engagement connection or the second locking engagement connection can include a threaded portion.

In another aspect, the invention provides a welding device including a first locking engagement connection disposed between a first component and a second component with the first locking engagement connection defining a first tapered portion with a first included angle. The welding device also includes a second locking engagement connection disposed between a third component and a fourth component. The second locking engagement connection includes a second tapered portion defining a second included angle smaller than the first included angle. Upon application of a force between the first component and the fourth component, the first locking engagement connection adjusts before adjustment of the second locking engagement connection. In some embodiments, the second component and the third component include portions of the same component.

In yet another aspect, the invention provides a retaining head or a diffuser including a first tapered surface adapted for locking engagement with a tapered surface of a first member and a second tapered surface adapted for locking engagement with a tapered surface of a second member. In some embodiments, the first member is a gooseneck. The second member can include a collet, a contact tip or a nozzle. Upon application of a force (e.g., a torquing force) between the first member and the second member, the locking engagement between the tapered surfaces of the retaining head or diffuser and the first member can adjust before the locking engagement between the tapered surfaces of the retaining head or diffuser and the second member adjusts. The retaining head or diffuser can also include a third tapered surface adapted for locking engagement with a tapered surface of a third member.

In still another aspect, the invention features a method of engaging components of a welding device. The method can include providing a first locking engagement connection disposed between a first component and a second component, and including a first tapered portion defining a first included angle. The method can also include providing a second locking engagement connection disposed between the second component and a third component, and including a second tapered portion defining a second included angle smaller than the first included angle. Applying a force between the first component and the third component can adjust the first locking engagement connection before the second locking engagement connection adjusts. In various embodiments, either the first locking engagement connection or the second locking engagement connection can improve either electrical conductivity or heat transfer between adjacent components of the welding device.

In another aspect, the invention provides a method of engaging components of a welding device. The method can include providing a component including a first tapered surface adapted for locking engagement with a tapered surface of a first member and a second tapered surface adapted for locking engagement with a tapered surface of a second member. Applying a force between the first member and the second member can adjust the locking engagement between the tapered surfaces of the component and the first member before adjustment of the locking engagement between the tapered surfaces of the component and the second member. In a particular embodiment, the component includes a retaining head or a diffuser. In such an embodiment, the first member can include a contact tip. The second member can include a nozzle, a gooseneck, or a collet.

The methods for engaging components of a welding device can include engaging the first locking engagement with a clamping force greater than a clamping force associated with the second locking engagement connection. The first locking engagement connection can disengage before the second locking engagement. In still another embodiment, the first or the second locking engagement connection or both can improve electrical conductivity or heat transfer between adjacent components of the welding device. In yet another embodiment, the method includes applying a force between the first component and the third component that results in a torquing force between the first component and the third component. In one embodiment, at least one of the first locking engagement connection or the second locking engagement connection includes a threaded portion.

In yet another aspect, the invention features an apparatus for engaging components of a welding device. The apparatus can include a component including a first tapered surface adapted for locking engagement with a tapered surface of a first member and a second tapered surface adapted for locking engagement with a tapered surface of a second member. The apparatus also includes a means for applying a force between the first member and the second member so that the locking engagement between the tapered surfaces of the component and the first member adjusts before the locking engagement between the tapered surfaces of the component and the second member. In a particular embodiment, the component is a retaining head or a diffuser. In such an embodiment, the first member can include a contact tip. The second member can include a gooseneck, a nozzle, or a collet.

BRIEF DESCRIPTION OF THE DRAWINGS

The foregoing discussion will be understood more readily from the following detailed description of the invention, when taken in conjunction with the accompanying drawings, in which:

FIG. 9 is an end view of an embodiment of a collet of the invention;

FIG. 10 is a side view of the embodiment of FIG. 9;

DETAILED DESCRIPTION

Figure 1:
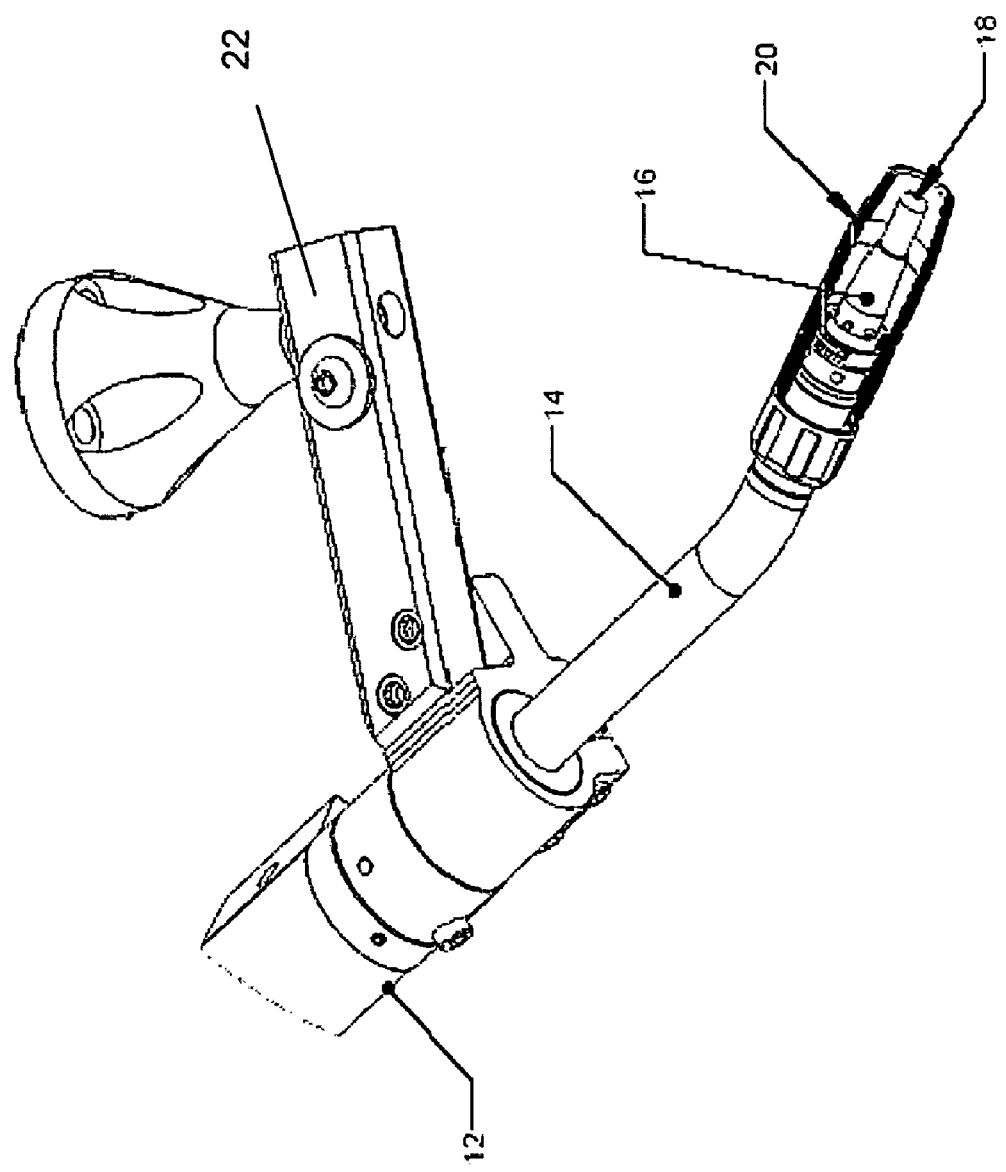
FIG. 1 illustrates a known MIG welding torch.
Figure 2:
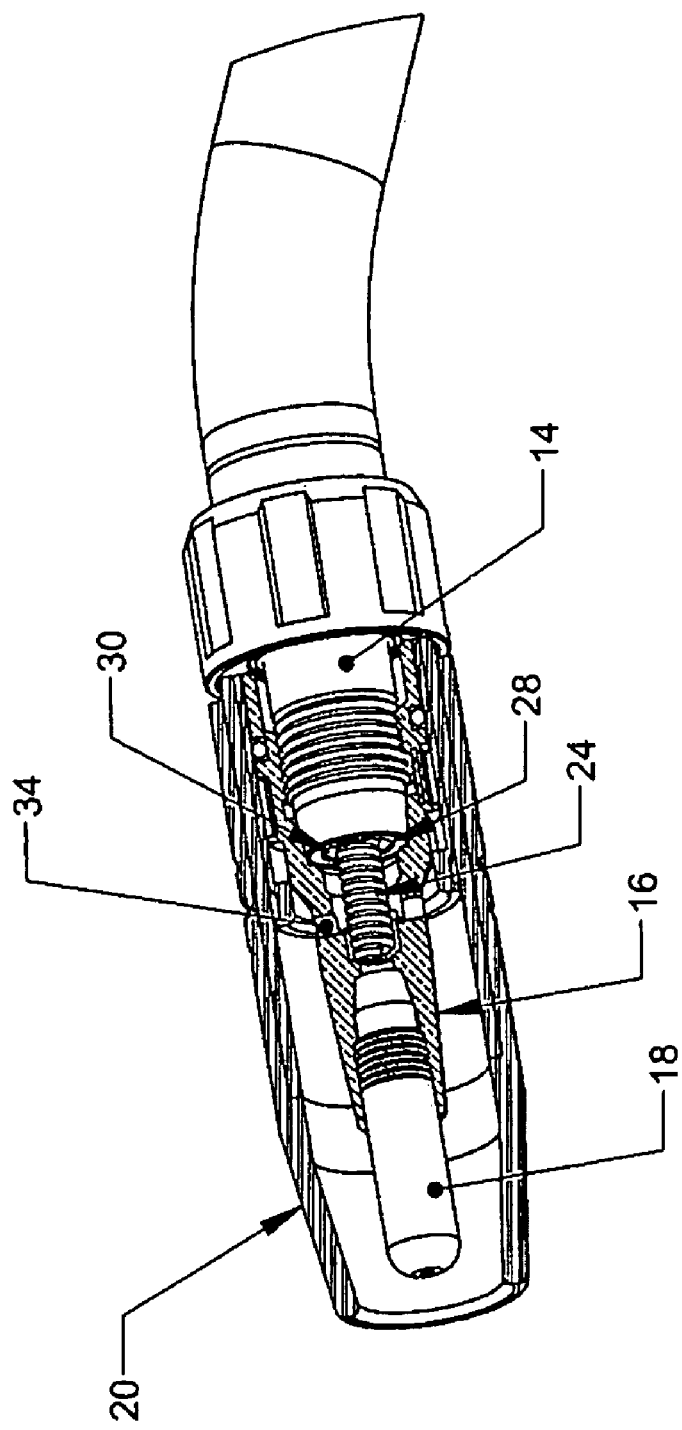
FIG. 2 is a partial cross-sectional view of the head of the MIG welding torch of FIG. 1.
Figure 3:
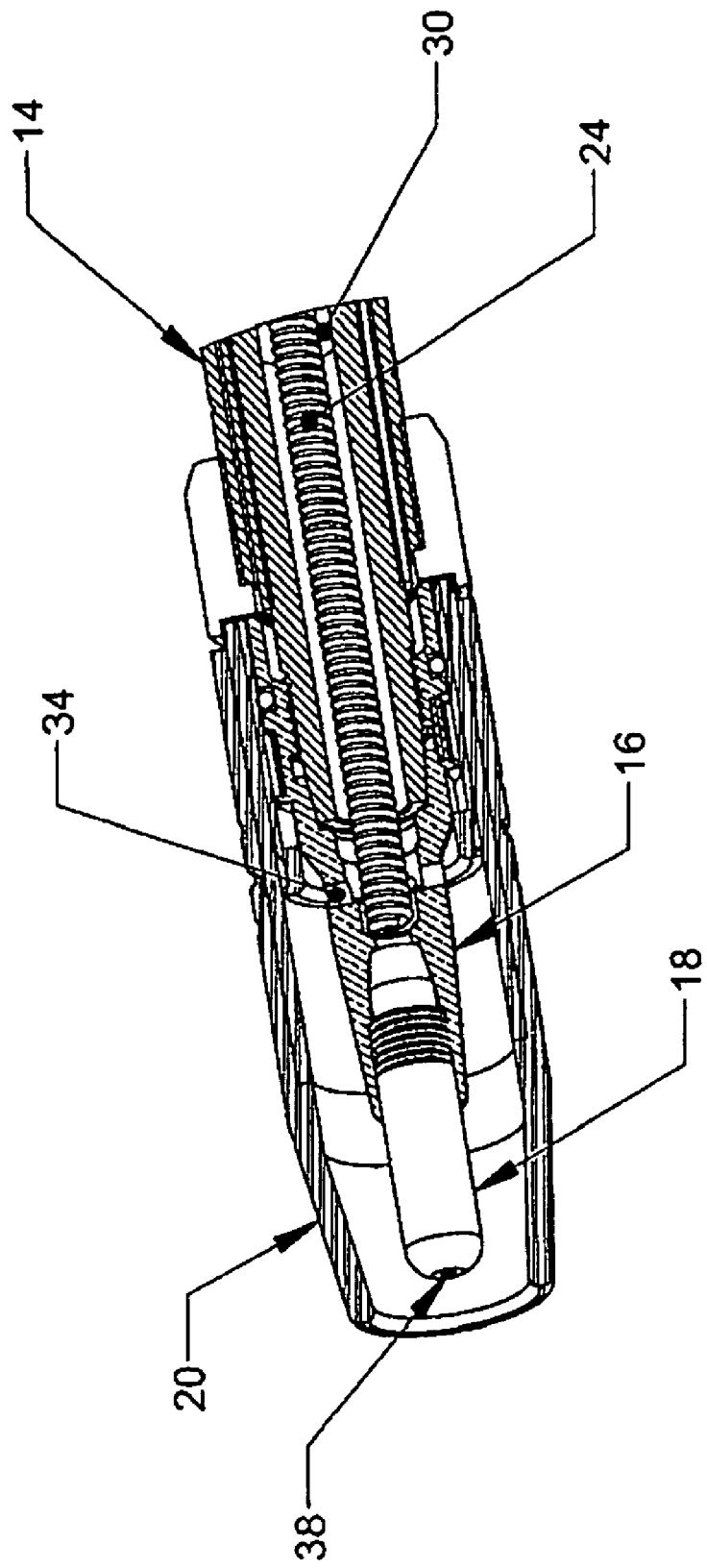
FIG. 3 is a partial cross-sectional view of the head of the MIG welding torch of FIG. 1 illustrating how a liner can be positioned within the torch.
Figure 4:
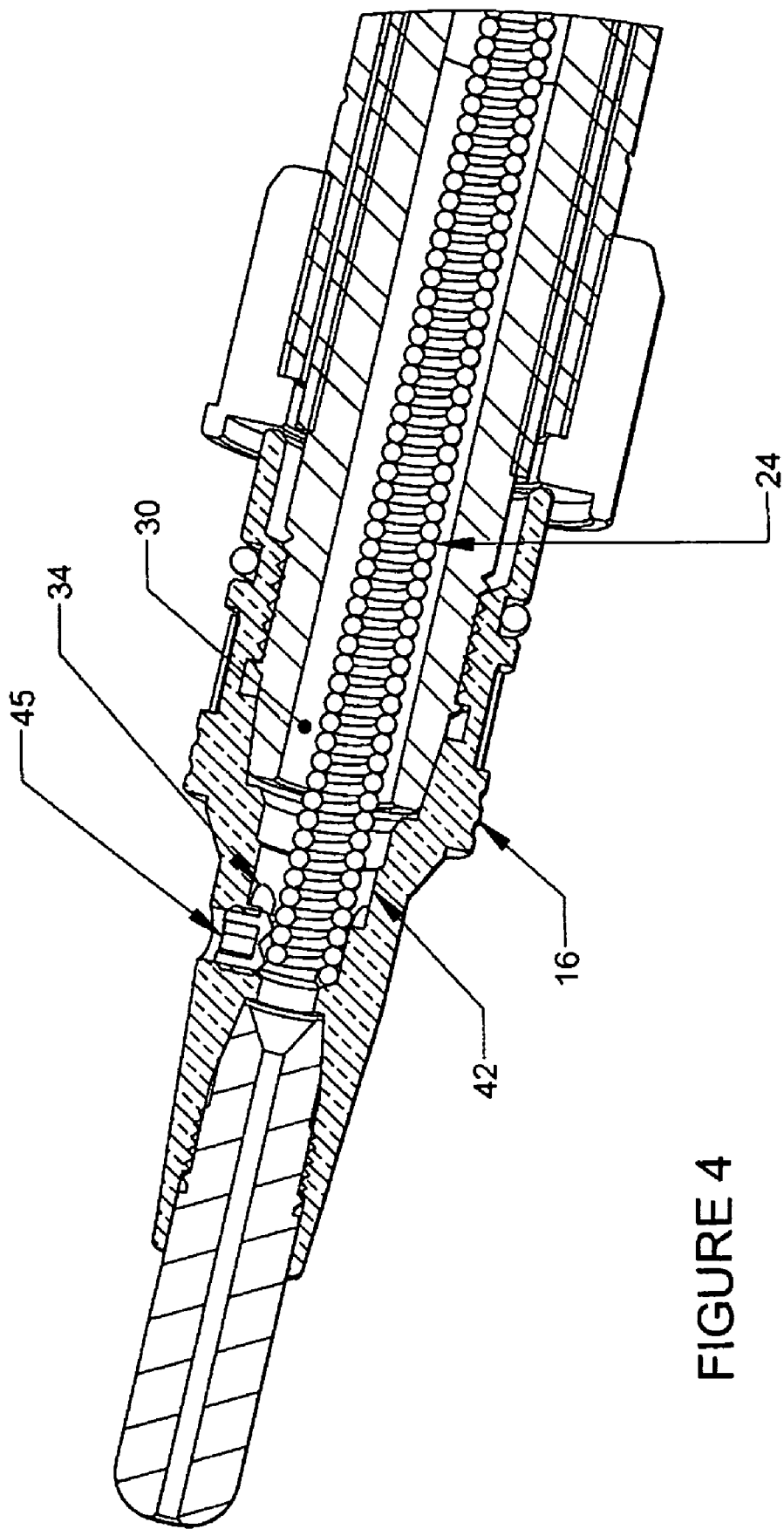
FIG. 4 illustrates a known method for securing a liner within a torch head of a MIG welding torch.
Figures 5A, 5B:
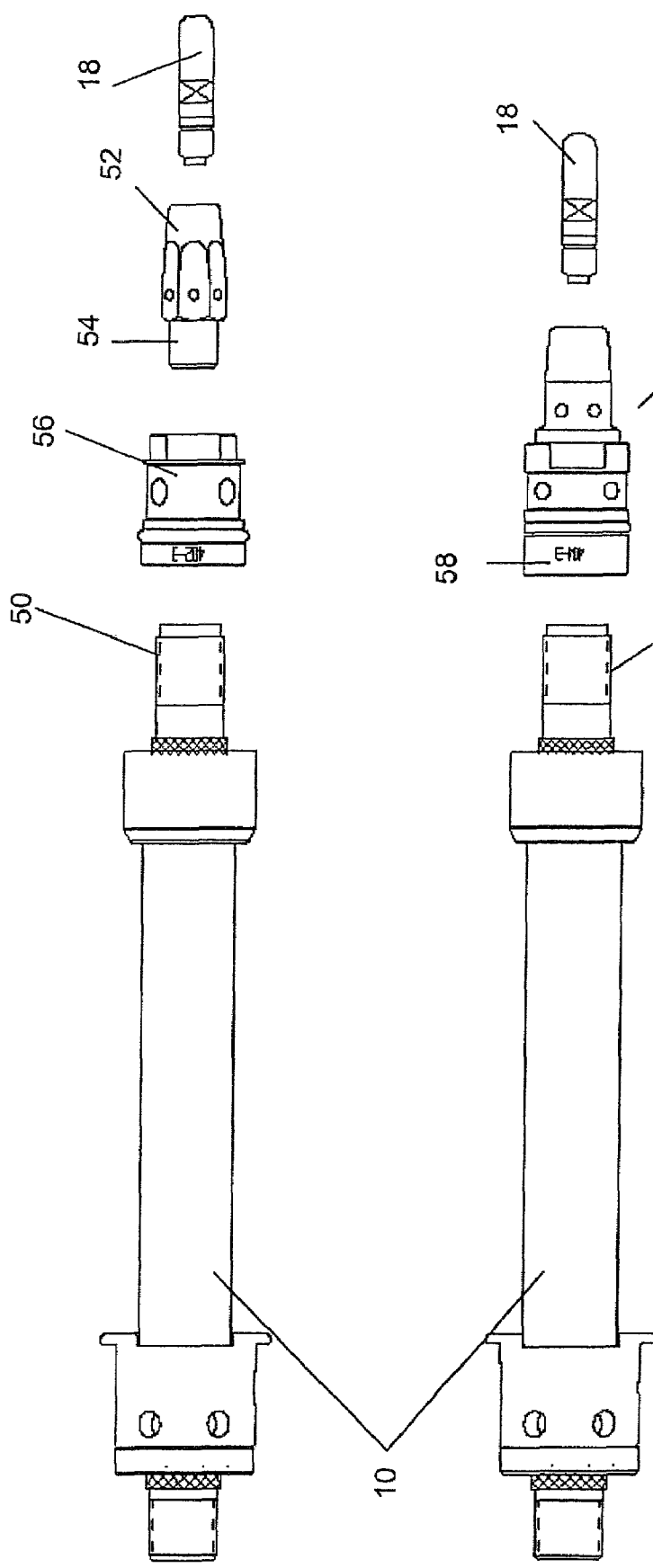
FIGS. 5A-5B depict an exemplary configuration illustrating differences between a diffuser and a retaining head.

FIGS. 5A-5B depict an exemplary configuration illustrating differences between a diffuser and a retaining head. FIG. 5A illustrates an exemplary configuration of torch components employing a gas diffuser, and a nozzle retainer. FIG. 5B illustrates a torch configuration having a retaining head. As illustrated the gooseneck 14 defines an exterior threaded region 48 disposed on an exterior surface of the gooseneck 14 ("external threads") and an interior threaded region 50 disposed on an interior surface of the gooseneck 14 ("inside threads"). Various torch components can engage the threaded portions 48, 50, thereby securing the components to the gooseneck 14.

In one embodiment, a gas diffuser 52 including an exterior threaded portion 54 can be configured to threadably engage the inside threads 50 of the gooseneck. After the diffuser 52 is secured, the nozzle (not shown) can be secured directly to the external threads 48 of the gooseneck 14. In another embodiment, the torch can include a nozzle retainer 56 that threadably engages the external threads 48 of the gooseneck 14. The nozzle retainer 56 can include a set of external threads. In such an embodiment, the nozzle threadably engages the set of external threads of the nozzle retainer 56 rather than the external threads 48 of the gooseneck 14.

In one embodiment, a retaining head 16 includes a threaded region 58 disposed on an interior surface of the retaining head 16 for engaging the external threads 48 of the gooseneck 14. In this way, the retaining head 16 can be secured to the gooseneck 14. In such an embodiment, a nozzle can be secured to the torch by engaging the exterior surface of the retaining head 16.

In some embodiments, the retaining head 16 and the diffuser 52 can be configured to engage and secure a contact tip 18 to the torch. Both the diffuser 52 and the retaining head 16 can include tapered portions for engaging various torch components, e.g., as discussed more fully below. Additionally, either component can be used in a torch system.

Figure 6:
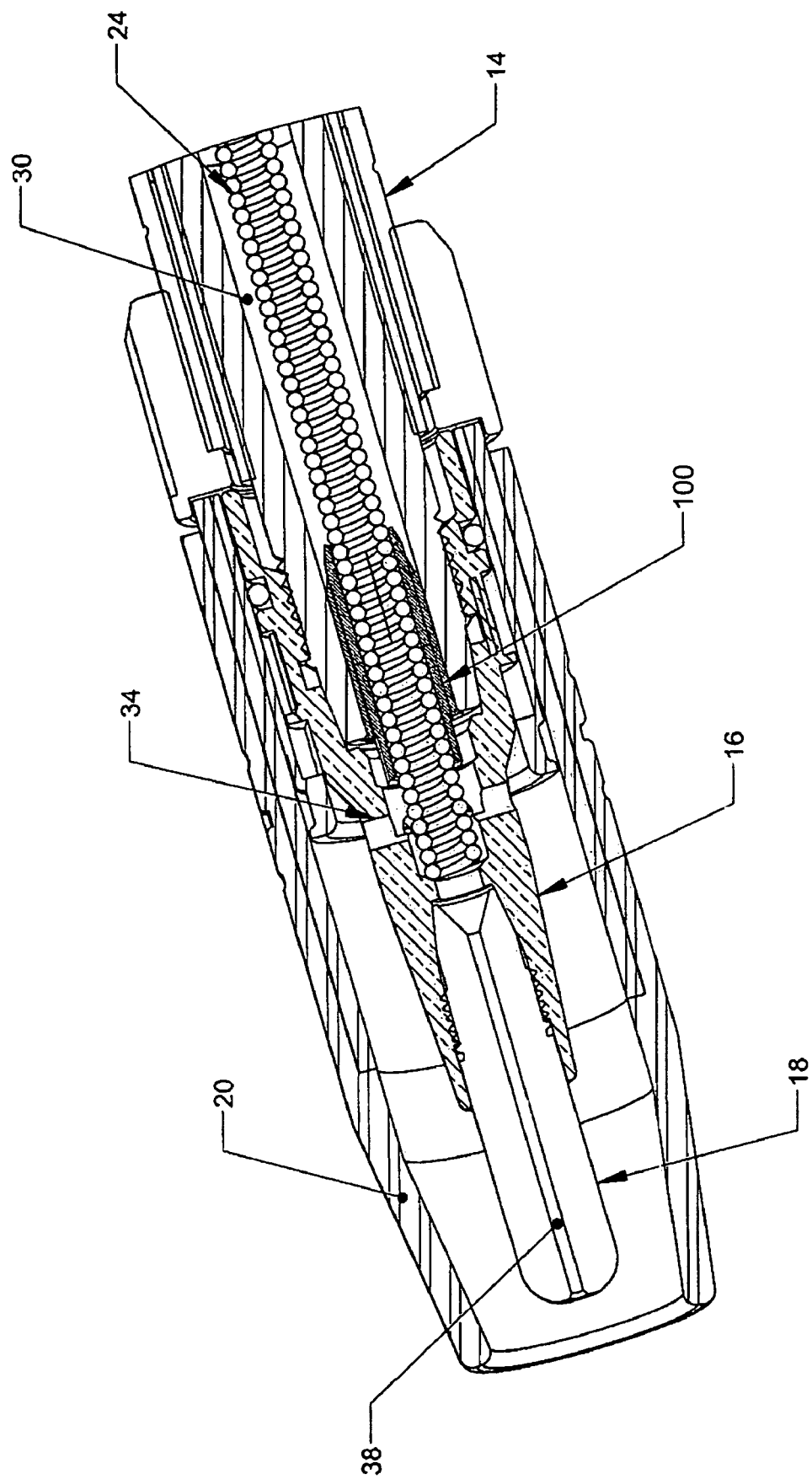
FIG. 6 is a cross-sectional view of a torch head showing a liner secured within a torch head.

FIG. 6 is a cross-sectional view of a torch head showing a liner secured within a torch head, according an embodiment of the invention. The head of a welding torch includes a liner 24 that passes through a gooseneck 14. A proximal end of the liner 24 is positioned with respect to the gooseneck 14 and secured to the gooseneck 14, by securing a collet 100 in the gooseneck 14.

A retaining head 16 can be secured to the gooseneck 14, establishing a position of the retaining head 16 with respect to the gooseneck 14 and with respect to the liner 24 that has been secured to the gooseneck 14. In an embodiment in which the collet 100 can include two sets of threads, the retaining head 16 can threadably connect directly to the collet 100. A contact tip 18 can be secured to the retaining head 16, and a nozzle 20 can be positioned over the resulting assembly. In such an embodiment, the nozzle 20 can be secured to the retaining head 16, to the gooseneck 14, or to a nozzle retainer 56. During assembly, the different components can be aligned such that a continuous welding wire can pass through openings from the distal end of the torch, to the proximal end of the torch and to the workpiece being welding. In one embodiment, a liner collet 100 can be secured to the gooseneck 14, the retaining head 16, the diffuser 52, or the contact tip 18 via at least one tapered locking engagement.

During use of the torch a welding wire (not shown) passes from a distal end of the liner 24, through the liner 24, through the retaining head 16, and through the wire channel 38 disposed within the contact tip 18. The welding wire then extends from the contact tip 18 and towards the workpiece(s) to be welded (not shown). As the welding wire is consumed during the welding process, additional wire can be supplied from the distal end of the torch (e.g., from a wire spool).

During the welding operation, a shield gas (e.g., argon, or a mixture of argon with other gases) can be supplied to the annular space 30 between the liner 24 and the gooseneck 14. This shield gas can flow from the distal end of the torch, towards the proximal end of the torch and the entrance cavity 42 of the retaining head 16 or diffuser. At least a portion of the shield gas can exit the retaining head 16 through one or more vent holes 34. The shield gas can pass along the outside of the retaining head 16, the outside of the contact tip 18 and can exit the nozzle 20. In some embodiments, a portion of the shield gas can also pass through the wire channel 38 of the contact tip 18, if the diameter of the wire channel 38 is sufficiently greater than the diameter of the welding wire passing therethrough. Additional shield gas flow configurations will become apparent to one of skill in the art, in view of the teachings described herein.

Figures 7, 8:
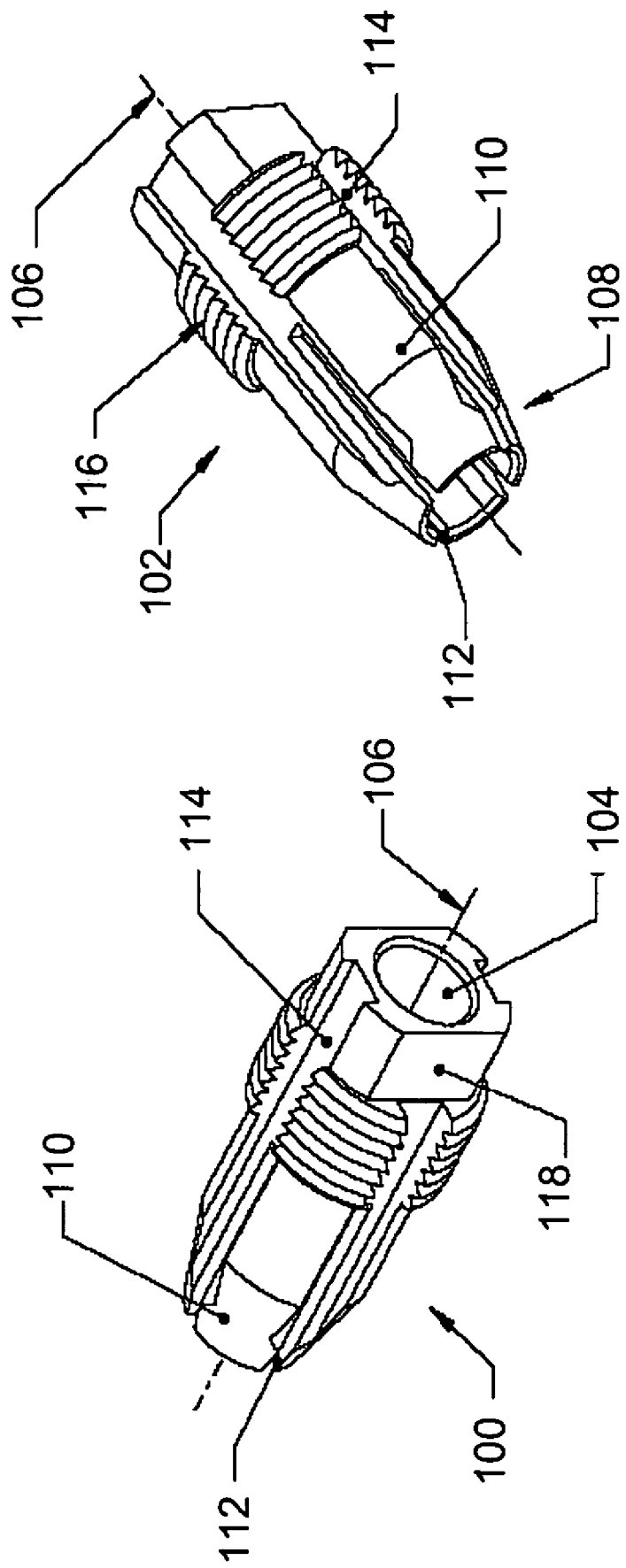
FIGS. 7 and 8 illustrate a perspective view of an embodiment of the invention from different angles depicting a gas passageway disposed on the exterior of the hollow body.

FIGS. 7 and 8 illustrate a perspective view of an embodiment of the invention from different angles depicting a gas passageway disposed on the exterior of the hollow body. The collet comprises a hollow body 102 defining a central passage 104 along a longitudinal axis 106 therethrough. A compression region 108 is defined relative to a distal end of the collet and can be located at the distal end of the collet. The compression region 108 can include one or more compression fingers 110, e.g., defining a compression slot 112. A plurality of compression slots 112 can be disposed between and defined by a plurality of compression fingers 110. Spacing of a plurality of compression fingers can be used to define a plurality of compression slots. The width of a compression slot 112 can be reduced when the collet 100 is tightened into a gooseneck 14, e.g., as described in more detail below. Alternatively, the compression region 108 can include or can be, e.g., a continuous ring of resilient material having a circumference and a diameter. The ring can compress upon or provide surface frictional forces to the liner 24 upon application of a compressive radial force to the compression region 108. Embodiments include forming the compression region 108 integrally with the hollow body 102. The integral assembly can be manufactured from a suitable high-temperature flexible or resilient polymeric material (e.g., a polyimide) such as VESPEL (registered trademark of E.I. DuPont de Nemours and Company, Wilmington, Del.). The integral collet assembly can also be manufactured from a metal or a metal alloy.

The collet 100 includes at least one gas passageway 114 disposed relative to a longitudinal surface of the hollow body 102. The gas passageway 114 can allow shield gas from the annular space 30 to flow to the proximal end of the collet 100 when the collet 100 is positioned between the liner 24 and the gooseneck 14. The shield gas can then flow to the vent hole 34 or the entrance cavity 42 of the retaining head 16 or diffuser 52. The gas passageway 114 can be defined by the exterior surface of the hollow body 102 and can be an open channel, e.g., as illustrated in FIGS. 7 and 8. In some embodiments, the hollow body 102 can include at least one set of external threads 116 for securing the collet 100 to the gooseneck 14 or other components. In such embodiments, the gas passageway 114 can pass through the external threads 116, e.g., in a direction substantially parallel to the longitudinal axis 106. In other embodiments, the gas passageway 114, or a portion of the gas passageway, can be disposed within the hollow body 102. For example, the gas passageway can be disposed adjacent to or near the central passage 104 of the hollow body 102. In some embodiments, the hollow body 102 can define a second set of external securing threads. The second set of external threads can include a different pitch than the first set of external securing threads.

The collet 100 can also include at least one surface 118 accessible from the proximal end of the hollow body 102 for securing the collet within the gooseneck 14. For example, the surface can include a pair of "flats" for tightening (or loosening) with a wrench, or other geometric configurations can be used. The at least one surface 118 can be defined by an exterior surface at the proximal end of the hollow body 102, e.g., an external hexagonal shape suitable for torquing with a socket. It can also be defined by an interior surface at the proximal end of the hollow body 102, e.g., an internal hexagonal shape that mates with an Allen wrench. A TORX (registered trademark of Textron Innovations Inc., Providence, R.I.) configuration and many others can also be used. In a particular embodiment, the compression region 108 defines a tapered surface on the exterior surface of the collet 100. The tapered surface can be configured to engage a corresponding tapered surface on the gooseneck 14. In such an embodiment, the engagement between the tapered surface of the gooseneck, and the tapered surface defined by the compression region 108 at least secures the collet 100 to the gooseneck 14 or provides the radial force necessary to reduce the width of a compression slot 112. In some embodiments, the collet 100 can include a second tapered surface for lockingly engaging a corresponding tapered surface of, e.g., a retaining head 16, a diffuser 52, or a contact tip 18.

FIG. 9 is an end view of an embodiment of a collet of the invention. This embodiment includes four gas passageways 114A-D and four compression slots 112A-D. Four compression fingers 110A-D surround central passage 104. A side view of the embodiment of FIG. 9 is illustrated in FIG. 10. The gas passageway 114A-D can include an open channel.

FIG. 10 illustrates a side view of an embodiment of the invention shown in FIG. 9. Compression slot 112 is defined by compression fingers 110. Gas passageway 114 is defined by an exterior surface of the hollow body 102 and passes through external threads 116. At least one surface 118 for securing the collet 100 within a gooseneck 14 is accessible from the proximal end of the hollow body 102. Application of a compressive radial force on the compressive region 108 can reduce the width of compression slots 112, thereby creating a securing force against a liner (not shown) disposed within the central passage 104 of the collet 100. Such a compressive radial force can be created by tightening the collet within a gooseneck, e.g., using the torquing surface 118 that is accessible from the proximal end of the hollow body 102. For example, as the collet is threaded into the gooseneck by applying torque to surface 118, an inside surface of the gooseneck can press the compression fingers toward the longitudinal axis 106. The compression fingers can thereby be pressed into the liner 24, reducing the width of the compression slots 112, and creating a frictional compressive force between the exterior surface of the liner and the interior surface of the compression region 108 (i.e., the compression fingers 110). In one embodiment, the collet can include a tapered portion defined by the compression region 108 configured to mate with a corresponding tapered portion of the inside surface of the gooseneck to form a tapered locking engagement therebetween. Other embodiments of the invention can include a collet with different numbers of compression slots 112, e.g., one slot, two, three, five, or more. Zero compression slots can be used when the compression region is made of a material having sufficient flexibility or resiliency, and sufficient frictional force between the liner and the compression region can still be generated. Further, some embodiments can include a hollow body 102 with no external threads. In such an embodiment, radial or longitudinal frictional forces or a tapered locking engagement can secure the collet 100 in a fixed location with respect to the gooseneck 14.

Figure 12:
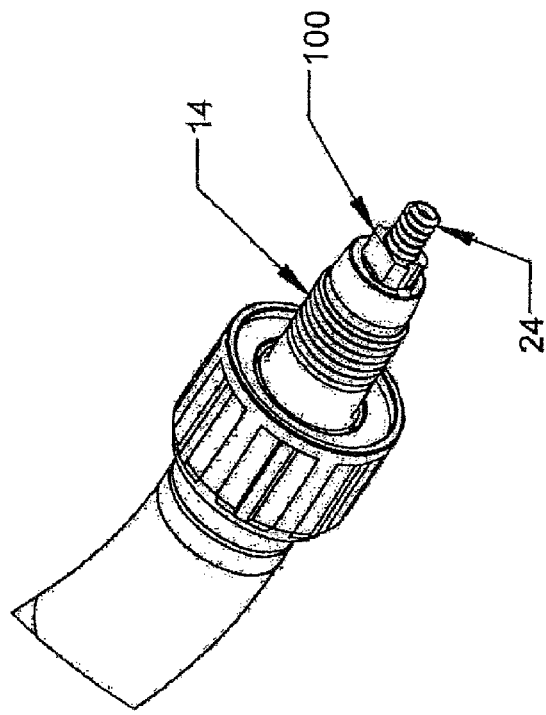
FIG. 12 illustrates the collet of FIG. 9 after it has been secured in the gooseneck.
Figure 11:
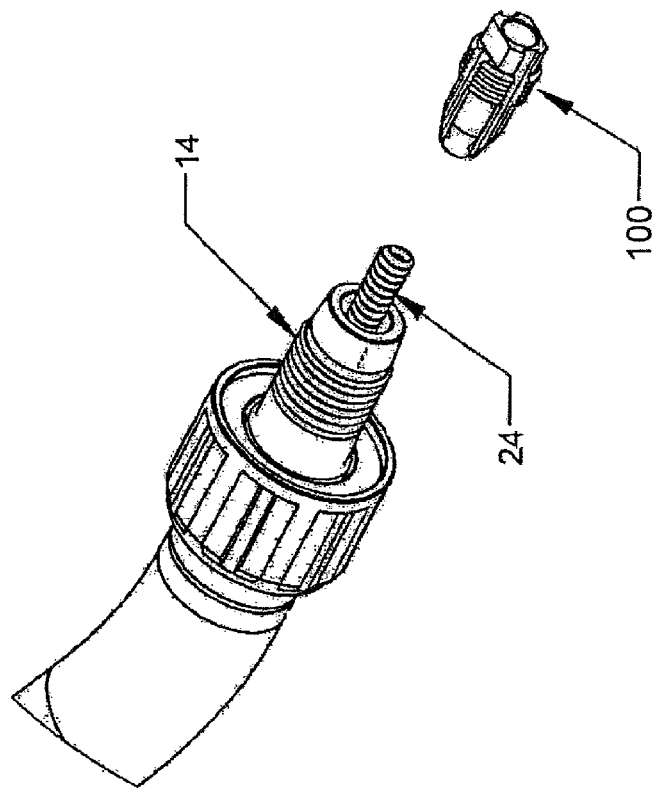
FIG. 11 illustrates a collet of FIG. 9 as it can be positioned within a gooseneck.

FIGS. 11-12 depict an exemplary embodiment of the invention including a method of positioning the liner within a welding torch. A collet 100 is provided and a liner 24 is passed through the gooseneck 14 and through the central passage 104 of the collet 100. A longitudinal position of the liner can be established with respect to the collet 100, and then with respect to the gooseneck 14 by securing the collet 100 to the gooseneck 14. Alternatively, the position of the liner 24 can first be established with respect to the gooseneck 14, and then with respect to the collet 100 by securing the collet 100 to the gooseneck 14. Preferably, the collet 100 is secured to an inside surface of the gooseneck 14, between the gooseneck 14 and the liner 24. The inside surface of the gooseneck 14 can have receiving threads to accept, e.g., external threads 116 of the collet 100, but these are not mandatory. Once the collet 100 is secured to the gooseneck (FIG. 12), the retaining head or diffuser (not shown) can be connected to the gooseneck, and the contact tip 18 can be secured to the retaining head or the diffuser, or the retaining head or the diffuser can be connected directly to the collet if the collet has a set of external threads available for connecting to the retaining head or the diffuser. The nozzle 20 can be positioned over the torch head assembly to protect the assembly and channel the shield gas flow once the gas flow is established and torch operation is commenced.

The step of establishing the position of the liner can further include centering the liner 24 with respect to the gooseneck 14, centering the liner 24 with respect to the retaining head or diffuser or both. Centering the liner 24 can reduce the wear of torch components, especially wear caused by the passage of welding wire. The establishing step can also axially constrain the liner (i.e., in a longitudinal direction), in a direction substantially parallel to longitudinal axis 106. Such constraint helps extend the useful life of the torch components, such as the liner 24 and the retaining head 16, by minimizing abrasion during general movement of the torch, as described above.

The advantages are achieved when the collet of the invention is used with this positioning method, including embodiments in which the collet includes one or more tapered surfaces for locking engagement with other torch components. In addition, use of the collet 100 e.g., of FIG. 7, also allows the shield gas to flow past the collet 100 and toward the workpiece, while achieving the liner alignment/centering benefits and axial constraint advantages of this aspect of the invention.

The invention also includes a method of manufacturing a collet 100. A hollow body 102 defining a central passage 104 is provided, the body having at least one set of external threads 116. A compression region 108 comprising at least one compression finger 110 is formed, preferably at the distal end of the body. A gas passageway 114 can be disposed along an exterior surface of the body, passing through the external securing threads 116. A securing structure, such as flat surfaces for torquing by a wrench, is formed at a proximal end of the hollow body 100, such that application of a tightening torque causes at least one compression finger 110 to secure the distal end of the collet 100 to a liner 24 when the collet is tightened into a gooseneck 14. In one embodiment, the compression region defines a tapered portion for engaging a corresponding tapered surface of a gooseneck 14. One or more compression fingers 110 can define one or more compression slots 112, and the gas passageway 114 can be formed as an open channel along the exterior surface of the hollow body 102, e.g., passing through the external securing threads 116. In another embodiment, the securing structure can be replaced by a second tapered surface that is configured to engage a corresponding tapered surface of a diffuser. This embodiment is described more fully below.

The invention also includes welding torches incorporating features of the collet system described herein, including one or more tapered surfaces for locking engagement with other torch components. For example, an aspect of the invention includes a welding torch comprising a torch body having a handle 12 and a gooseneck 14, and a liner 24 passing through the gooseneck 14 and to a retaining head 16 or diffuser 52. The torch 12 includes an embodiment of the collet system, such as those described herein, such that tightening of the collet 100 within the gooseneck 14 fixes a position of the liner 24 with respect to the gooseneck 14, without blocking a flow of the shield gas through the gas passageway 28. The collet 100 can include a compression slot 112, e.g., defined by a compression finger 110. The collet can be an integral assembly formed from a metal or a high-temperature polymeric material. The collet can include a structure defined by a surface at a proximal end of the collet for providing a torque to the collet, to either tighten or loosen the collet within the gooseneck 14.

Figure 13:
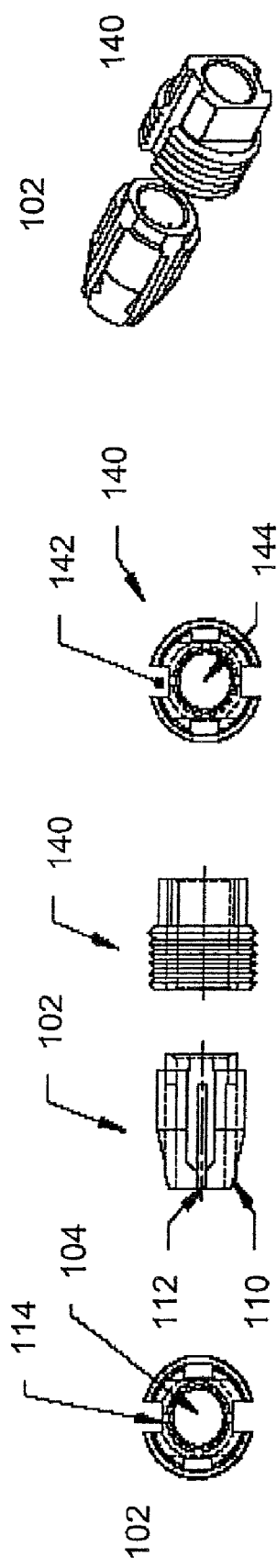
FIGS. 13 and 14 illustrate different two-piece embodiments of the invention.
Figure 14:
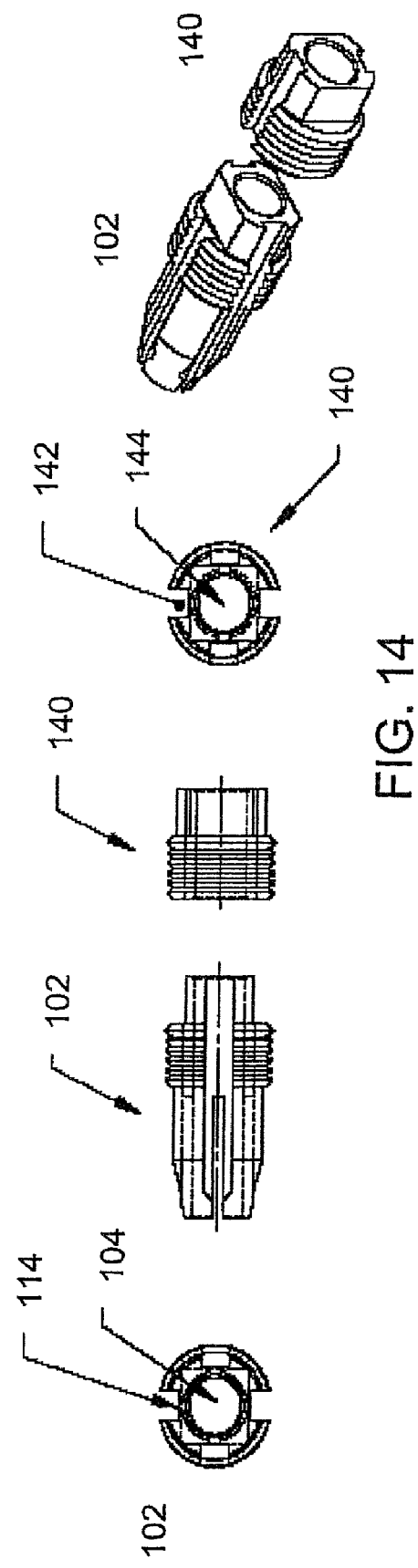

Not all embodiments of the collet require external threads 116 on the exterior of the hollow body 102. For example, FIGS. 13 and 14 illustrate two-piece collet systems. Referring to FIG. 13, the hollow body 102 can still include compression slot(s) 112, compression finger(s) 110, a central passage 104, and one or more gas passageways 114. In such embodiments, the compression region 108 can include a tapered portion for engaging a corresponding tapered surface of the gooseneck 14 to form a locking engagement therebetween. However, in these embodiments the hollow body 102 can merely be inserted in to a space between the liner 24 and the gooseneck 14. It can then be secured by a locking nut 140, the liner 24 passing therethrough. The locking nut 140 can be tightened into the gooseneck 14. Although the locking nut 140 preferably includes at least one gas passageway 144, it can have a different number of gas passageways than the hollow body 102, and the gas passageways 142 of the locking nut 140 need not align with gas passageways 114 of the hollow body 102. Since the liner 24 passes through both pieces of the collet (100 and 140), the most efficient gas transfer configuration occurs when the central passageway 144 of the locking nut 140 is approximately the same diameter as the central passageway 104 of the hollow body 102.

FIG. 14 illustrates a two-piece collet in which both the hollow body 102 and the locking nut 140 have external threads. In the illustrated embodiment, the hollow body 102 can include only two gas passageways 114. The optional locking nut 140 can provide additional assurance that the liner 24 will not become loose. Once again, there is no need for the gas passageways 142 of the locking nut 140 to align with the gas passageways 114 of the hollow body 102.

Figure 15:
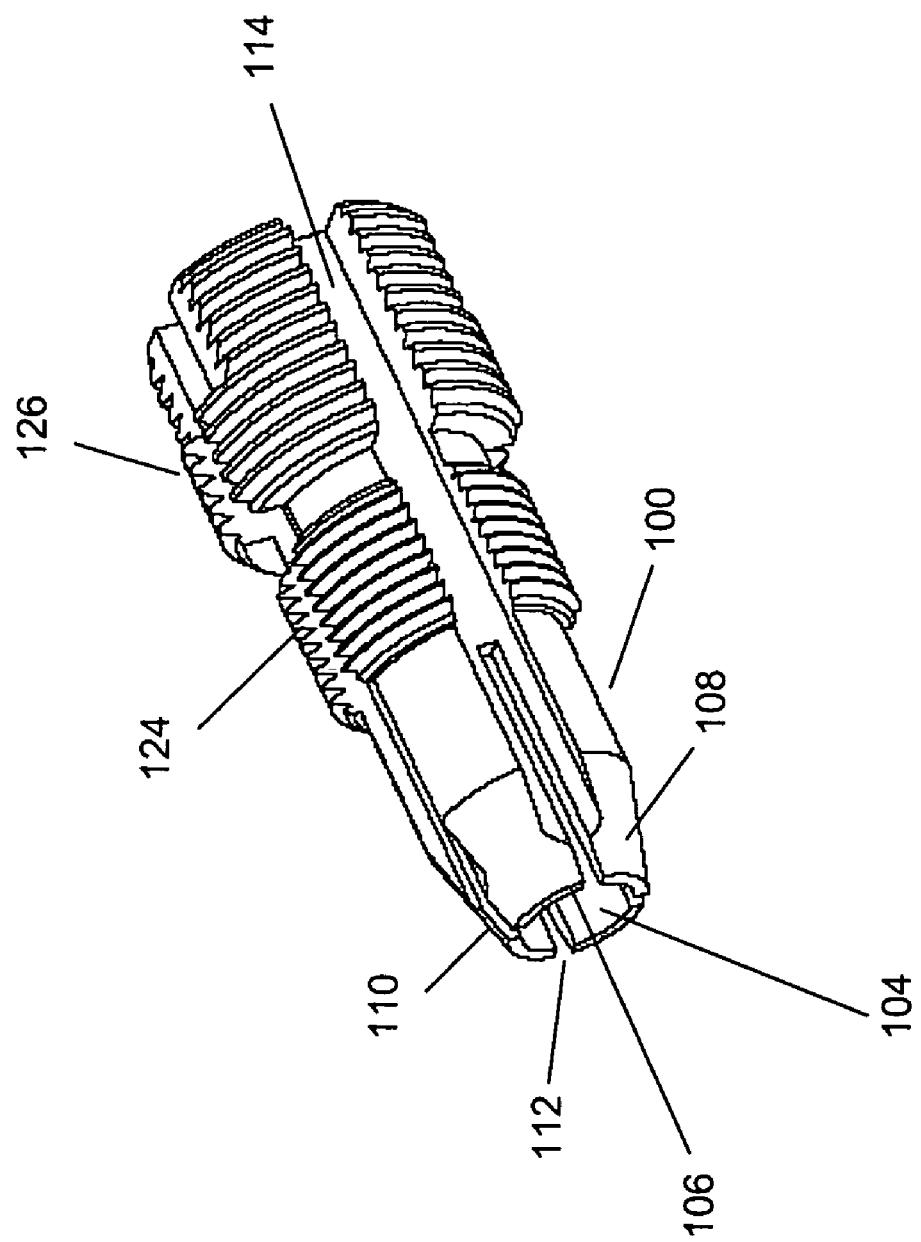
FIG. 15 depicts an embodiment of the invention in which a collet includes two sets of external threads of differing pitch.

FIG. 15 depicts an embodiment of the invention in which a collet includes two sets of external threads of differing pitch according to an embodiment of the invention. In one embodiment, the collet 100 includes the hollow body 102 defining a central passage 104 therethrough defining a longitudinal axis 106. The collet 100 also includes a compression region 108 that defines one or more compression fingers 110 that can define one or more compression slots 112. The collet 100 can be used to secure the position of the liner 24, e.g., as described above with respect to FIGS. 7-8. In the illustrated embodiment, the hollow body 102 can define a first set of external threads 124 and a second set of external threads 126. In such an embodiment, both sets of external threads 124, 126 can include a gas passageway 114 therethrough. In one embodiment, the gas passageway 114 can include an open channel. In the illustrated embodiment, the gas passageway 114 is substantially parallel to the longitudinal axis as it passes through both sets of external threads 124, 126, but such alignment is not required. In the embodiment depicted in FIG. 15, the first set of external threads 124 can be used to secure the collet 100 to the gooseneck 14, thereby securing the position of the liner 24 therethrough as described above. The first set of external threads 124 can connect to a threaded region disposed on the interior surface of the gooseneck 14. In such an embodiment, the compression region 108 can define a tapered surface for locking engagement with a corresponding tapered surface of the gooseneck 14. The second set of exterior threads 126 can be configured to engage a threaded portion disposed on the interior surface of the retaining head 16 or the diffuser 52. In an embodiment including the retaining head, a tapered surface of the retaining head can engage a corresponding tapered surface on the exterior of the gooseneck 14 to form a second locking engagement as discussed more fully below. In an embodiment including a diffuser, the collet 100 can have a second tapered surface that extends longitudinally and substantially coaxially with the central passage 104. The second tapered surface can be adjacent the second set of exterior threads 126 and remote from the first set of exterior threads for locking engagement with a corresponding interior surface of the diffuser. In such an embodiment, a contact tip can also form a tapered locking engagement with the diffuser 52. More particularly, the diffuser 52 can be configured for dual-locking taper connections.

Figure 16:
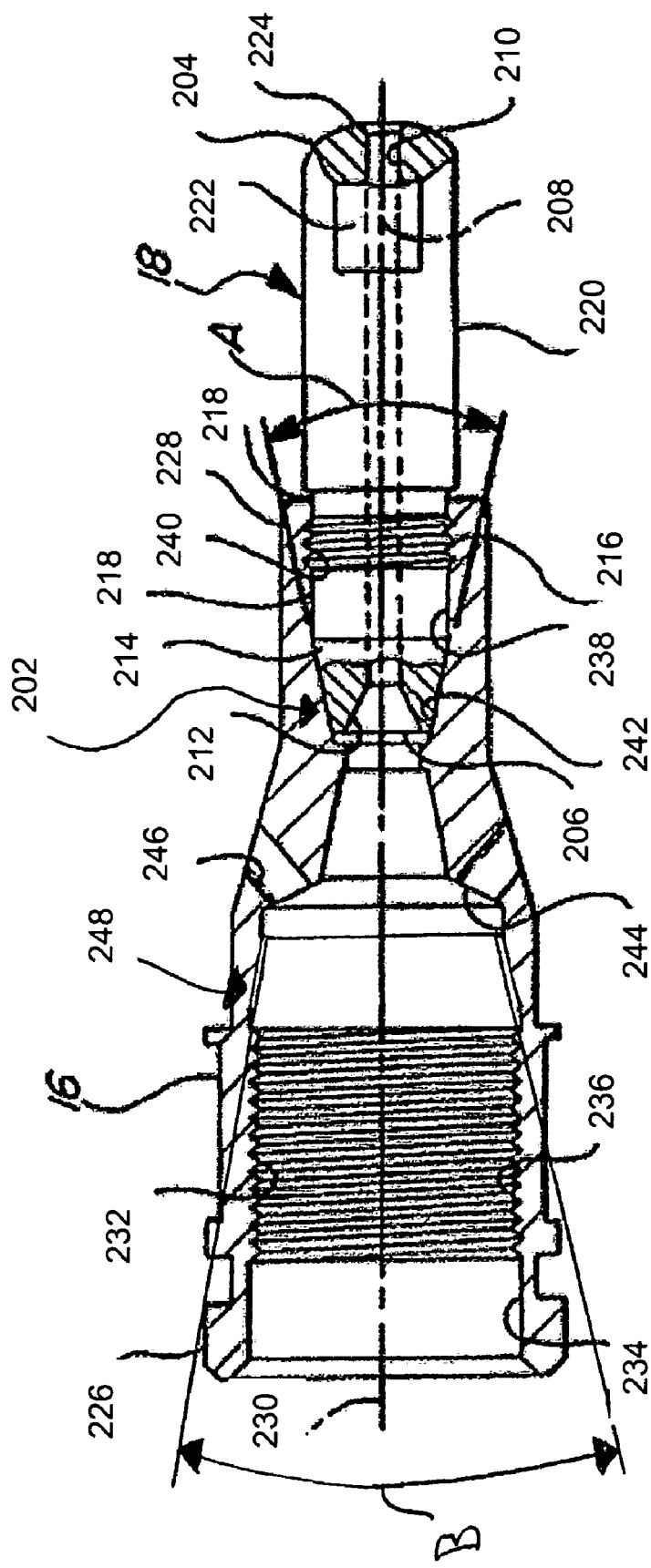
FIG. 16 depicts a cross-sectional view of an exemplary embodiment of a portion of a welding device including locking engagement connections.

FIG. 16 depicts an embodiment of an end portion of a welding torch 12 including a locking engagement connection 202 between the contact tip 18 and the retaining head 16, where the locking engagement connection 202 has been configured to improve the retention of the contact tip 18 by the retaining head 16 and to facilitate fast removal of the contact tip 18 from the retaining head 16. Although FIG. 16 depicts an embodiment of the invention including a retaining head, the same principles apply with respect to the diffuser 52. In an embodiment of the invention employing the diffuser, the diffuser can be configured to threadably engage the gooseneck 14 via inside threads of the gooseneck 14 in a tapered locking engagement. The nozzle 20 is not shown in FIG. 16, although one can be attached to the welding torch 12, the gooseneck 14, the retaining head 16, or a nozzle retainer (not shown).

The contact tip 18 as shown in FIG. 16 can be elongated in shape and has a first end 204 and an oppositely disposed second end 206. A tip axis 208 passes through the first end 204 and the second end 206 of the contact tip 18. The contact tip 18 can define a wire feed aperture 210 about the tip axis 208 that passes through the contact tip 18. The aperture 210 can include a tapered receiving end 212 at the second end 206 of the contact tip 18, which can facilitate receiving a welding wire (not shown) that can pass through the aperture 210 of contact tip 18.

Referring still to FIG. 16, the contact tip 18 is shown with a tapered portion 214 disposed at the second end 206. An included angle "A" of the tapered portion 214 can be about 20°, although the included angle "A" can be larger or smaller depending on the application, e.g., between about 5° and about 45°. Other angles, larger or smaller, can be used.

A threaded portion 216 can be disposed on the contact tip 18 adjacent the tapered portion 214. In various embodiments, a clearance diameter portion 218 is provided on one or both sides of the threaded portion 216.

In some embodiments, the threaded portion 216 can include double threads having an axial length greater than a pitch of the double threads (e.g., having an axial length greater than 3 times a pitch of the double threads). A fine thread can facilitate retention of the tip, while a double-threaded portion can facilitate quick removal of the contact tip 18 from the retaining head 16. In an embodiment having double threads, the double threads of the threaded portion 216 require half the number of turns to remove the contact tip 18 as compared to conventional tips using single threads, a feature that is desirable for robotic welding applications.

According to the embodiment illustrated in FIG. 16, an extension portion 220, larger in diameter than the clearance portion 218, extends from the first end 204 to the clearance portion 218, or to the threaded portion 216 if a clearance portion is not used. The extension portion 220 can assume any of several shapes, including a cylindrical form or a hexagonally cross-sectioned form. Other forms and cross-sectional shapes can also be used. The extension portion 220 can also include a gripping feature 222. The gripping feature 222, as shown in FIG. 16, includes a pair of parallel flats at the first end 204 of the contact tip 18. Alternatively, the gripping feature 222 can use a hexagonally shaped extension portion with three pairs of opposed flats. Other shapes requiring tools other than an open end wrench can be employed as the gripping feature 222. In one embodiment, the contact tip 18 can include a chamfer 224 on the first end 204.

In the illustrated embodiment, the retaining head 16 includes a first end 226 and a second end 228. A longitudinal axis 230 passes through the first end 226 and the second end 228 of the retaining head 16. The longitudinal axis 230 can be substantially coincident with tip axis 208. An axial aperture 232 can extend along the longitudinal axis 230, generally aligned with the wire feed aperture 210. In one embodiment, a first diameter portion 234 of the axial aperture 232 can be disposed at the first end 226, and can include internal threads 236 disposed therein. A second diameter portion 238 of the aperture 232 can be disposed at the second end 228 and can be smaller in diameter than the first diameter portion 234. The second diameter portion 238 can include internal threads 240.

A tapered seat 242 in the second diameter portion 238 can be complementary in shape to the tapered portion 214 of the contact tip 18, such that surfaces of the seat and the tapered portion can engage each other and mate together. These surfaces when seated or mated themselves can form a tapered portion of the welding device. This tapered portion can be used as a locking engagement connection, which can include a threaded portion adjacent the tapered portion. The included angle "A" can be selected to provide a locking engagement effect between the retaining head 16 and the contact tip 18 when the contact tip 18 is subjected to a force, e.g., a torquing force in a tightening direction.

In some embodiments, the included angle "A" is smaller than that illustrated in FIG. 16, and a greater number of threads are engaged between the retaining head 16 and the contact tip 18, thereby providing a more secure connection that has a greater resistance to loosening of the connection. Double threading the contact tip 18 can also facilitate removal and replacement of the contact tip 18, as described in more detail above. Use of the tapered engagement between the contact tip 18 and the retaining head 16 enables the use of fewer engagement threads on the contact tip 18, while still developing a sufficient amount of retention force between the parts to maintain proper engagement. This tapered locking engagement of the invention also provides a contact area between the contact tip 18 and the retaining head 16 that facilitates the rapid conduction of heat away from the contact tip 18.

In some embodiments, the retaining head 16 includes a transition region 244 in the axial aperture 232 disposed between the first diameter portion 234 and the second diameter portion 238. Gas ports 246 can extend from the transition region 244 to the outside of the retaining head 16, and can be oriented so that inert gas passing from inside the retaining head 16 through the gas ports 246 displaces air around the first end 204 of the contact tip 18.

As shown in FIG. 16, the retaining head 16 includes a tapered region 248, which can be used as a connection for locking engagement between a tapered region of the gooseneck 14 (not shown) and the retaining head 16. Although not shown, the tapered region of the gooseneck 14 can be threaded and engage the tapered region 248 of the retaining head 16. These tapered regions when seated or mated together can form a tapered portion of the welding device, which can be used as a locking engagement connection that can include a threaded portion adjacent the tapered portion. Included angle "B" of the tapered region 248 of the retaining head 16 can be larger, smaller, or substantially the same as the included angle "A" of the tapered portion 214 of the contact tip 18. In some embodiments, the included angle "B" can be between about 5° and about 45°. Other angles, larger or smaller, can be used without departing from the scope of Applicants' invention. In a particular embodiment, included angle "B" can be about 12°.

According to another aspect of the invention, the internal threads 236 in the first diameter portion 234 of the retaining head 16 can engage a liner collet (not shown) at an end of the goose neck 14. In one embodiment of the invention, the collet 100 includes a tapered portion for engaging a corresponding tapered portion of the retaining head 16 where the tapered portion of the retaining head 16 is disposed on an interior surface of the retaining head 16. However, the collet 100 need not include this tapered portion. Upon tightening, the threaded portion 216 of the contact tip 18 can engage the internal threads 240 of the retaining head 16 until the tapered portion 214 engages the seat 242. The clearance portions 218 disposed between the threaded portion 216 and the extension portion 220 can facilitate a clamping engagement between the tapered portion 214 and the retaining head 16 by preventing engagement of the extension portion 220 against the retaining head 16. The axial force induced by the threaded portion 216 and the internal threads 240 in response to application of a force (e.g., a torque or torquing force) between the contact tip 18 and the retaining head 16 can cause the tapered portion 214 to wedge into seat 242, thereby developing a frictional load between the contact tip 18 and the nozzle 16, which resists relative movement between the two parts. Locking engagement between the components can thereby be effectively achieved.

Figure 17:
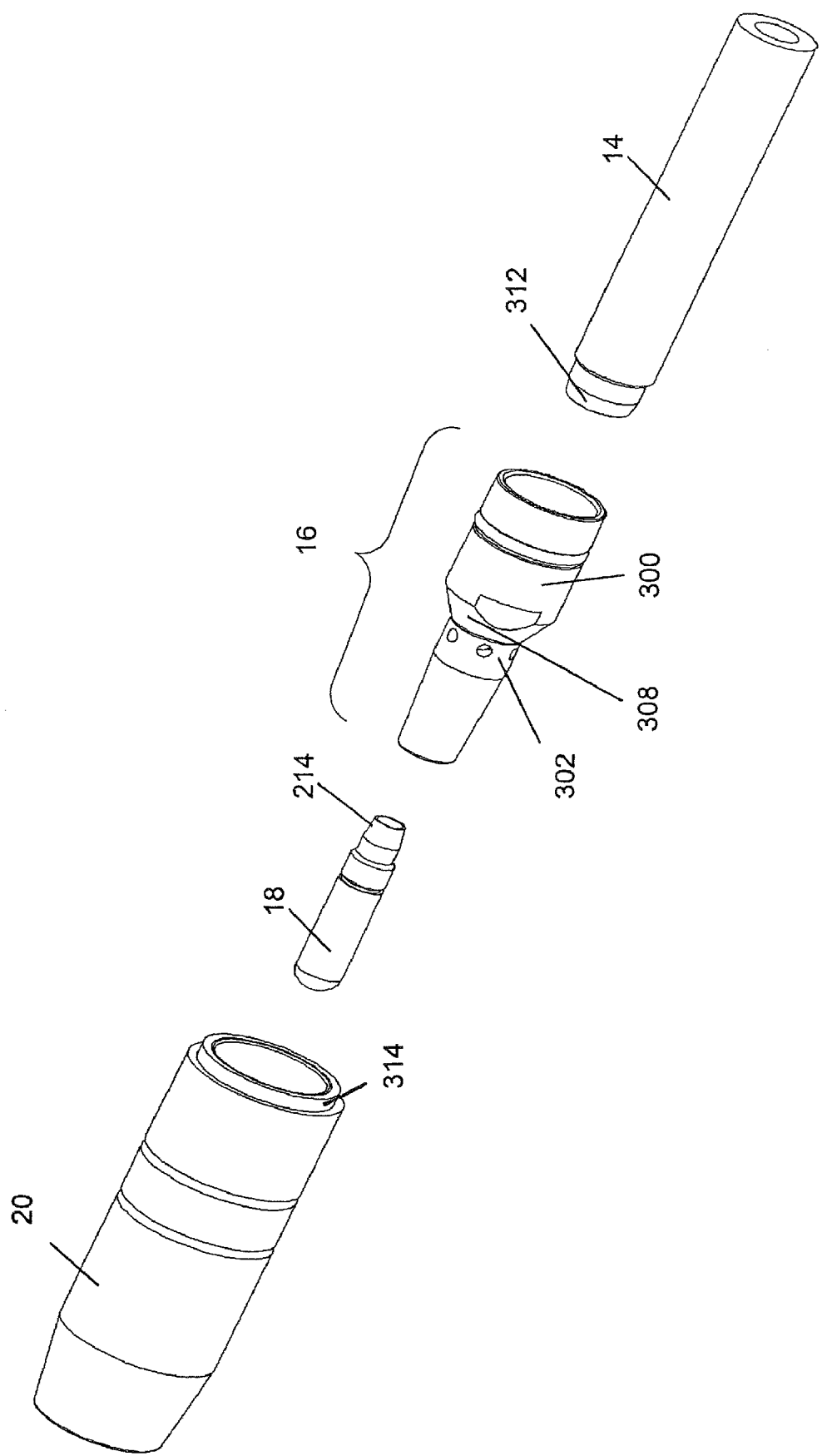
FIG. 17 depicts an exploded view of an exemplary welding device including locking engagement connections.
Figure 18:
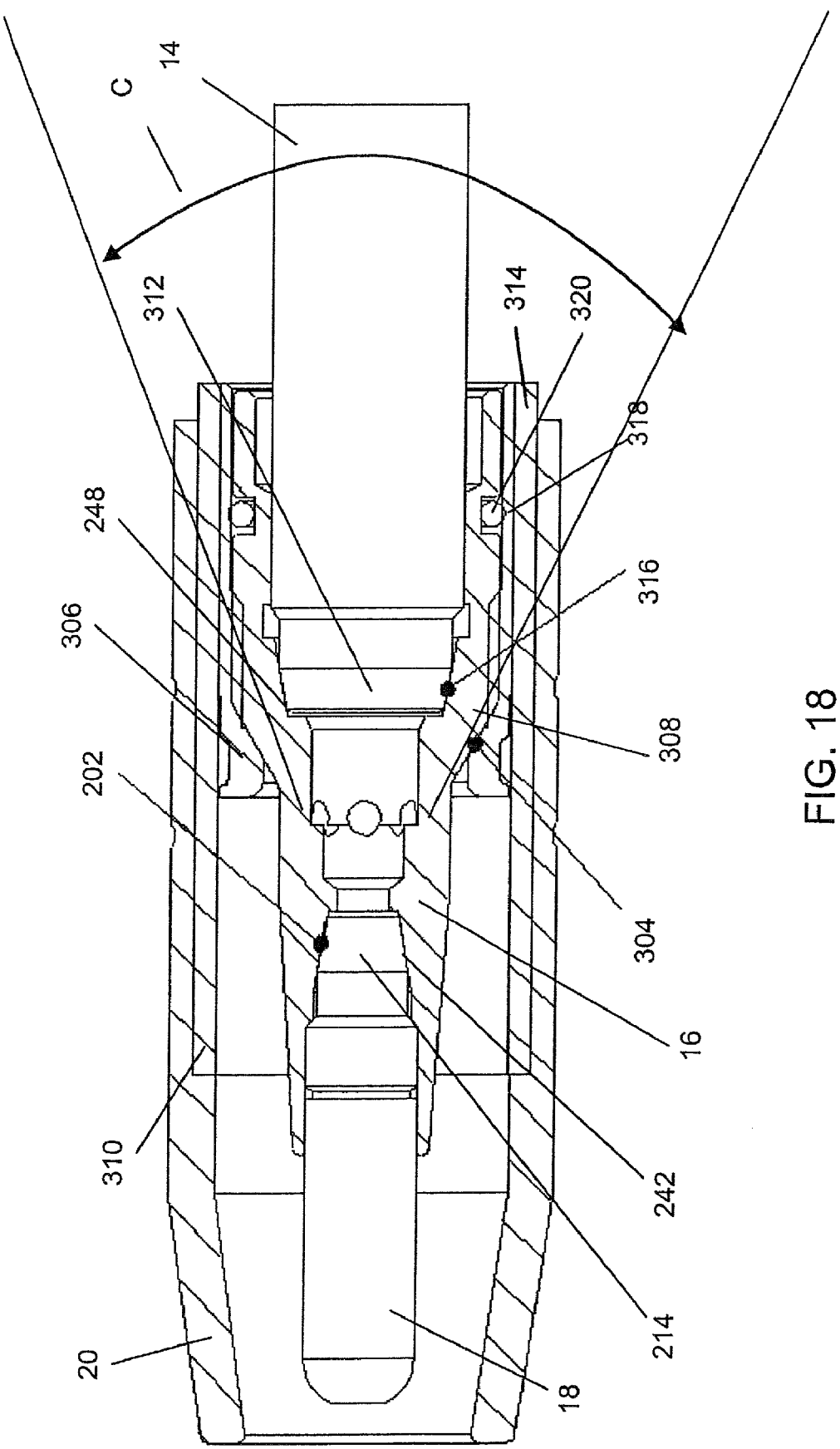
FIG. 18 shows a cross-sectional view of an exemplary end portion of a welding device including locking engagement connections.

FIG. 17 depicts an exploded view of an exemplary welding device including locking engagement connections. FIG. 18 shows a cross-sectional view of an exemplary end portion of a welding device including locking engagement connections. As illustrated, the welding torch 12 includes a nozzle 20, a contact tip 18, a retaining head 16, and a gooseneck 14. A diffuser 52 can be employed in place of the retaining head 16 without departing from the scope of the invention. The nozzle 20 can direct a gas for cooling a weld. The contact tip 18 can possess features as described above with respect to the contact tip 18 of FIG. 16. In various embodiments, the retaining head 16 includes a nozzle retaining portion 300 for stabilizing the nozzle 20, and a gas diffuser portion 302 for directing the cooling gas from inside the gooseneck 14 into the nozzle 20. In some embodiments, the retaining head 16 can be formed from two separate components (i.e., a nozzle retainer and a gas diffuser). In still other embodiments, only a diffuser portion without a nozzle retainer can be used. In such an embodiment, the nozzle 20 threads directly to the gooseneck 14. The gooseneck 14, which can have a bent configuration, provides the connection to the handle, to a power supply, and optionally to a robotic welding system. The welding torch 12 can include a liner (not shown) to improve the feed of a welding wire through the central bore of the welding torch.

FIGS. 17 and 18 show an additional illustrative embodiment of a locking engagement connection 202 between the contact tip 18 and the retaining head 16. According to these embodiments, the contact tip 18 includes a tapered portion 214 and the retaining head 16 includes a first tapered portion 242, referred to above as a "seat." The contact tip 18 and the retaining head 16 can be threaded together, as described above. During the threading process, the tapered portion 214 of the contact tip 18 seats into the first tapered portion 242 of the retaining head 16, at the locking engagement connection 202. These tapered portions when seated or mated themselves can form a tapered portion of the welding device. In various embodiments, the threads can include a single thread pattern or include a plurality of thread patterns. In some embodiments, a diffuser can replace the retaining head 16 and can include a tapered seat for engaging a contact tip as described herein.

As shown in FIGS. 17 and 18, a locking engagement connection 304 can be used to mate the nozzle 20 and the retaining head 16. The nozzle 20 can include a tapered portion 306, and the retaining head 16 can include a second tapered portion 308. The nozzle 20 and the retaining head 16 can be threaded together, thereby causing the second tapered portion 308 of the retaining head 16 to be seated into the tapered portion 306 of the nozzle 20 at the locking engagement connection 304. These tapered portions when seated or mated themselves can form a tapered portion of the welding device. The thread can be a single thread or multi-thread pattern.

An inside surface of the nozzle 20 can include an insulating material 310, e.g., a machineable porcelain material. The insulating material 310 can be fixedly or removably attached to the inside surface of the nozzle 20. The insulating material 310 can shield the nozzle 20 from electrical potential from the retaining head 16 or gooseneck 14. In some embodiments, a surface of this insulating material 310 can include a tapered portion and threads for engagement with the retaining head 16.

In various embodiments, the nozzle 20 can include a nozzle insert 314, which can be mated with the retaining head 16 or the nozzle retainer using the tapered locking engagement surfaces of the invention. The nozzle insert 314 can be fixedly or removably attached either to the inside surface of the nozzle 20 or to a surface of the insulating material 310.

In various embodiments, the respective tapered portion of the nozzle 20, the insulating material 310, or the nozzle insert 314 can include an included angle "C", which can be larger, smaller, or substantially the same as either included angle "A" or "B". In some embodiments, included angle "C" is between about 5° and about 75°, although the angle can be larger or smaller depending on the application. In a particular embodiment, included angle "C" can be about 60°.

FIGS. 17 and 18 also show another embodiment of a locking engagement connection 316, disposed between the retaining head 16 and the gooseneck 14. The retaining head 14 can include a third tapered portion 248, and the gooseneck 16 can include a tapered portion 312. The retaining head 16 and the gooseneck 14 can be threaded together, thereby seating the tapered portion 312 of the gooseneck 14 into the third tapered portion 248 of the retaining head 16 at the locking engagement connection 316. These tapered portions when seated or mated together can form a tapered portion of the welding device. The thread can be a single thread or multi-thread pattern.

In some embodiments, the retaining head 16 can include a groove 318, e.g., for an o-ring. FIG. 18 illustrates an o-ring 320 seated in the groove. The o-ring 320 can provide a fluid seal (e.g., for a cooling gas) between the retaining head 16 and the nozzle insert 314 of the nozzle 20, although, in various embodiments, the o-ring 320 can seat against the nozzle 20 or the insulating material 310 of the nozzle 20.

In accordance with the invention, certain components of a welding device (e.g., the welding torch 12) can use more than one taper of the invention. For convenience, FIGS. 17 and 18 show a single welding torch 12 with three embodiments of locking engagement connections 202, 304, and 316. This need not be the case. A welding device of the invention can utilize only a single locking engagement connection, or two or more locking engagement connections.

For example, the locking engagement connection 304 can be used to engage the nozzle 20 and the retaining head 16, while the locking engagement connection 316 can be used to engage the same retaining head 16 with the gooseneck 14. In another exemplary embodiment, the locking engagement connection 202 can mate the contact tip 18 and the retaining head 16, and the locking engagement connection 316 can be used to engage the retaining head 16 and the gooseneck 14. Other combinations are also possible, and as described above, more than two tapers can be used.

Further, two or more different locking engagement connections can be used to provide the locking engagement of the invention, and each locking engagement connection can use a different included angle (e.g., angles "A" and "B" of FIG. 16 and angle "C" of FIG. 18). Use of two different angles within, e.g., a welding torch, causes the two different connections to engage with different amounts of force, e.g., clamping or retention force. Thus, one of the connections can have a tendency to come apart before the other when a force, e.g., a loosening force or a loosening torque, is provided. More specifically, the connection utilizing a larger included angle "A" can loosen first upon application of a force (e.g., a loosening force or a loosening torque), for example, as compared with a connection using a smaller included angle such as included angle "B". Of course, such a force can be directly applied, or it can result from other forces such as vibration, temperature, and the like.

Embodiments of the invention include, but are not limited to, the locking engagement connection 202 defining an included angle (e.g., of about 20°) between the contact tip 18 and the retaining head 16, and the locking engagement connection 316 defining a smaller included angle (e.g., of about 12°) between the retaining head 16 and the gooseneck 14. Of course, other angles can be used without departing from the scope of Applicants' invention.

A force (e.g., a loosening force or a loosening torque) between the gooseneck 14 and the contact tip 18 preferentially results in the contact tip 18 loosening from the retaining head 16 before the retaining head 16 loosens from the gooseneck 14. In some applications this is advantageous, e.g., because the first connection (i.e., between the contact tip and the retaining head) is more accessible, or because a user can wish to change a contact tip without removing the retaining head. The invention can also be applied to applications with more than two connections, and in some applications, it can be desirable for different connections to become preferentially loosened. Of course, the invention can also be applied in connection with tightening forces or tightening torques.

Figure 19:
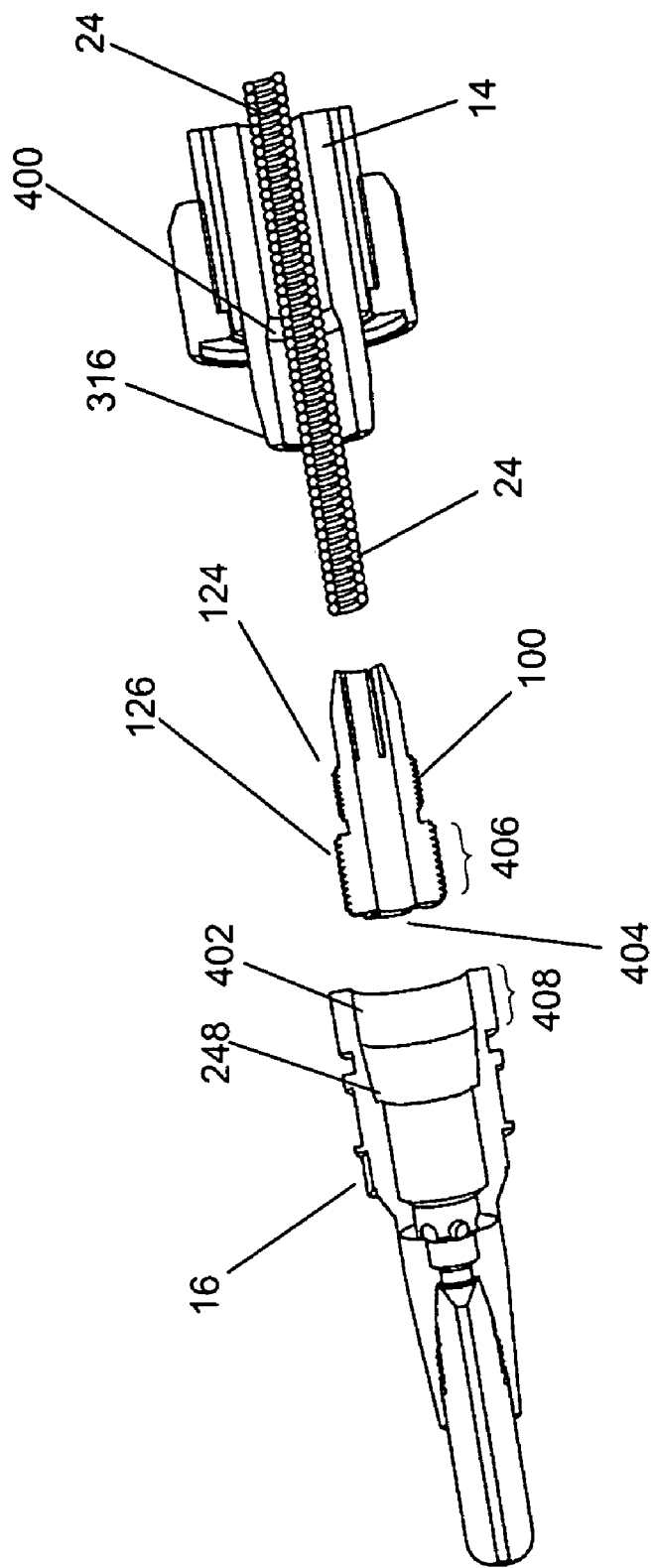
FIG. 19 depicts an exploded view of a tapered collet an other torch components.

FIG. 19 depicts an embodiment of the invention employing a dual-threaded collet for securing the liner in a fixed position. The collet 100 can include two sets of threads 124, 126 for engaging various torch components disposed on the exterior surface of the hollow body. In one embodiment, the first set of external threads 124 can engage a threaded region defined by the interior surface of the gooseneck 14. The gooseneck can include a tapered portion 316 disposed on the exterior of the gooseneck, and a tapered portion 400 disposed on the interior of the gooseneck. The retaining head can include an interior tapered portion 248 and an interior threaded region 402 configured to threadably engage the second set of external threads 126 of the collet 100. The collet can also include an end 404 longitudinally opposing the compression region 108. In the illustrated embodiment, the end 404 forms a plane substantially orthogonal to the longitudinal axis defined by the hollow body 102. In some embodiments, the end 404 can define a tapered surface, including, e.g., a frustoconical shape, configured to mate with a corresponding tapered surface of a diffuser thereby creating a tapered locking engagement. The invention contemplates such a locking engagement between the retaining head 16 and the collet 100. In still other embodiments, the end 404 of the collet does not "bottom out" in the retaining head 16 or diffuser 52. Optionally, the second set of external threads 126 includes a longitudinal dimension 406 that is less than the longitudinal dimension 408 of the threaded region 402 of the retaining head 16 or diffuser.

Figure 20:
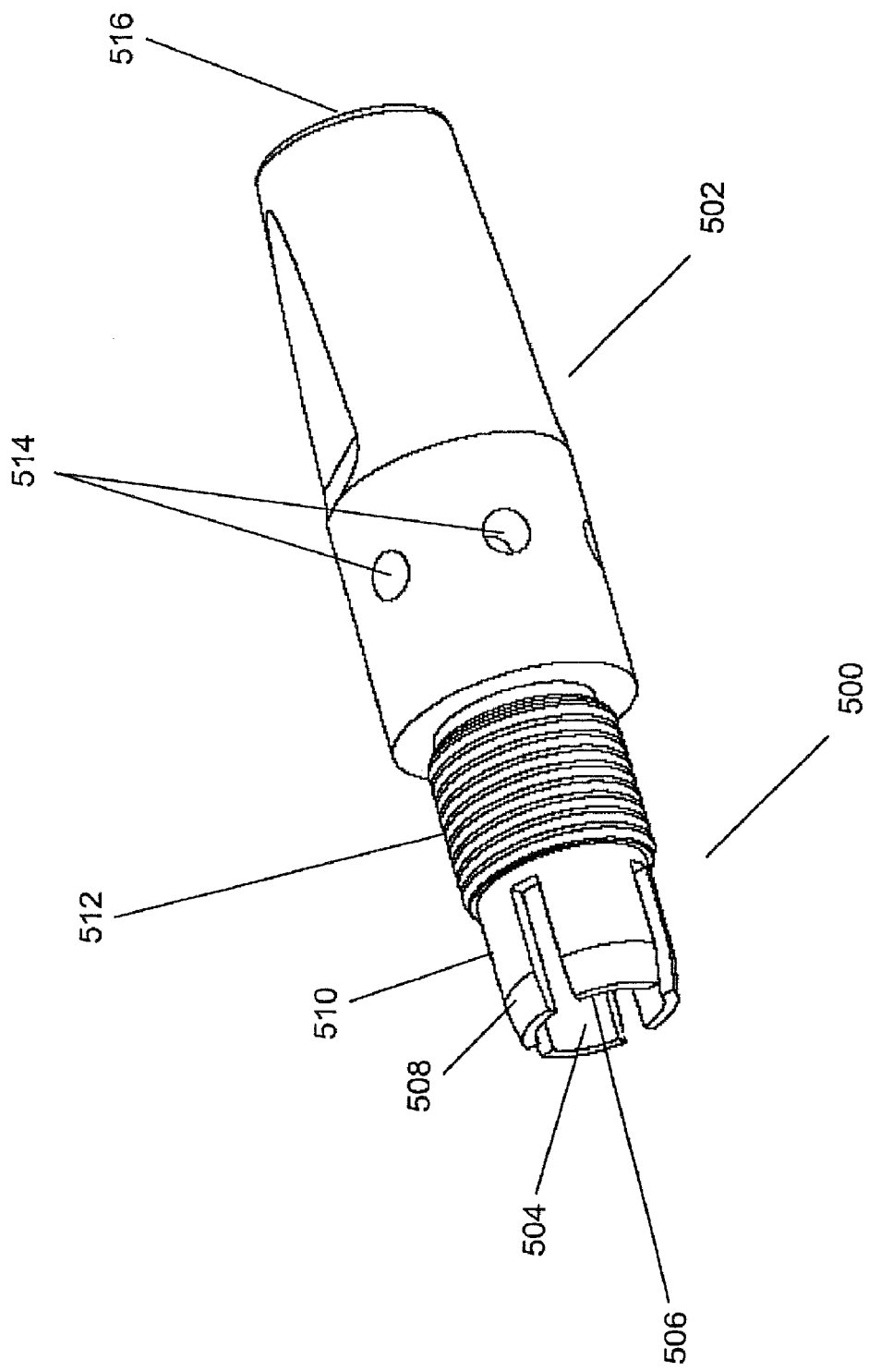
FIG. 20 depicts a collet including a diffuser portion.

FIG. 20 depicts a collet including a diffuser portion, according to an embodiment of the invention. A torch component can include a collet portion 500 and a diffuser portion 502 which comprise integral portions of the same torch component. In another embodiment, a separate diffuser 52 can engage a collet 100 to form a two-piece torch component substantially equivalent in shape to the component depicted in FIG. 20. The component can include a hollow portion 504 defining a longitudinal axis 506 passing therethrough. The component can also include a compression region 508, and the compression region 508 can include one or more compression fingers 510 that define one or more compression slots 512. The collet portion 500 can also include a threaded region 512 disposed on the exterior surface of the hollow body 504. In the illustrated embodiment, the diffuser portion 502 includes one or more gas ports 514 for venting shield gas away from the hollow body 504. The diffuser portion 502 can include an end 516 longitudinally opposed to the collet portion 500. In a particular embodiment, the end 516 defines a tapered seat (not shown) configured, e.g., as described above with respect to FIGS. 16-18, for engagement with the contact tip 18.

In the illustrated embodiment, the collet portion 500 is designed and constructed to engage the gooseneck 14, e.g., in the manner described above with respect to FIG. 6. In such an embodiment, connecting the collet portion 500 with the gooseneck 14 can provide a radial force against the compression region 508 sufficient to radially and axially constrain the liner (not shown). In one embodiment, the threaded region 512 of the collet portion 500 can engage a corresponding threaded region on the gooseneck. The compression region 508 can define a tapered surface for locking engagement with a corresponding tapered surface of the gooseneck 14. In such an embodiment, the component can include two tapered surfaces. The first tapered surface can be defined by the compression region 508 and the second tapered surface can be defined by the tapered seat (not shown) disposed in the end 516 of the diffuser portion 502 for engaging the contact tip 18.

In yet another embodiment, a collet 100 that includes one or more tapered surfaces, e.g., as illustrated and described above with respect to FIGS. 6 and 7, can be used with a diffuser 52 to produce a two-piece torch component including one, two or three locking engagement connections. In some embodiments, the collet 100 can include the tapered seat disposed in the end of the diffuser portion 502, e.g., for engaging a contact tip, and the tapered surface defined by the compression region, e.g., as described above. The third tapered locking engagement connection can be incorporated at the interface between the collet 100 and the diffuser 52, e.g., as contemplated above and described with respect to FIG. 19.

While various aspects of the invention have been particularly shown and described with reference to specific preferred embodiments, it should be understood by those skilled in the art that various changes in form and detail can be made therein without departing from the spirit and scope of the invention as defined by the appended claims.

What is claimed is:

1. A method for positioning a liner with respect to a gooseneck of a welding torch, the method comprising the steps of:
passing the liner through a central passage of a collet to establish a position of the liner with respect to the collet, the collet receiving and being secured to the liner to position the liner within the gooseneck; and
establishing the liner position with respect to the gooseneck by securing the collet to the gooseneck.

2. The method of claim 1 wherein securing the collet to the gooseneck includes positioning a tapered surface of the collet in contact with a corresponding tapered surface of the gooseneck.

3. The method of claim 1 wherein securing the collet to the gooseneck includes engaging a first set of external threads of the collet with a threaded region of the gooseneck.

4. The method of claim 1 further comprising the step of connecting a retaining head or a diffuser to the gooseneck or the collet.

5. The method of claim 4 wherein connecting the retaining head or the diffuser comprises engaging a threaded region of the retaining head or the diffuser with a threaded region of the gooseneck or a second set of external threads of the collet.

6. The method of claim 1 wherein the establishing step further comprises centering the liner with respect to the gooseneck.

7. The method of claim 1 wherein the establishing step axially constrains the liner.

8. The method of claim 1 wherein the collet comprises: a hollow body defining a central passage along a longitudinal axis therethrough and having at least one set of external securing threads; a compression region comprising at least one compression slot defined by at least one compression finger, disposed at a first end of the body; at least one gas passageway defined by an exterior surface of the hollow body to be an open channel disposed along the exterior surface of the body, the gas passageway passing through the at least one set of securing threads and providing for a gas flow between the first end and a second end of the body; and at least one surface accessible from the proximal end of the body for securing the body within the gooseneck.

9. The method of claim 8 wherein the compression region further comprises a first tapered surface adapted for locking engagement with a tapered surface of a first component.

10. A method of manufacturing a collet comprising:
forming a hollow body defining a central passage along a longitudinal axis therethrough, the body having at least one set of external securing threads;
forming at least one compression finger at a first end of the body, the at least one compression finger being configured to be secured to a liner within a torch gooseneck to position the liner within the gooseneck;
establishing a gas passageway along an exterior surface of the hollow body between the first end and a second end of the body, the gas passageway passing through the at least one set of securing threads; and
forming a securing structure at the second end of the body, such that the securing structure can be used to cause the at least one compression finger to secure the distal end to a liner when the second end engages a gooseneck.

11. The method of claim 10 further comprising providing a first tapered surface adapted for locking engagement with a corresponding tapered surface of a first component.

12. The method of claim 10 wherein the at least one compression finger defines at least one compression slot.

13. The method of claim 10 wherein the gas passageway is an open channel disposed along the exterior surface.

14. A welding torch comprising:
a torch body having a handle and a gooseneck;

a liner passing through the gooseneck and to a retaining head; and a collet, the collet comprising: a hollow body defining a central passage along a longitudinal axis therethrough; a compression region defining at least one compression slot disposed at a first end of the hollow body and configured to receive and to be secured to the liner to position the liner within the gooseneck; at least one gas passageway disposed along an exterior surface of the hollow body, providing a gas flow between the first end and a second end of the hollow body; and at least one surface accessible from the second end of the hollow body for securing the hollow body within the gooseneck, such that tightening the collet fixes a position of the liner with respect to the gooseneck, without blocking the gas passageway.

15. The welding torch of claim 14 wherein the compression region of the collet further comprises a first tapered surface for lockingly engaging a tapered surface of a first component.

16. The welding torch of claim 14 wherein the compression region includes at least one compression slot defined by at least one compression finger.

17. The welding torch of claim 14 wherein the collet is an integral assembly comprising a metallic or polymeric material.

18. The welding torch of claim 14 wherein the at least one surface is defined by an exterior surface disposed relative to the second end of the body.

* * * * *

UNITED STATES PATENT AND TRADEMARK OFFICE
CERTIFICATE OF CORRECTION

PATENT NO. : 7,663,074 B2  Page 1 of 1
APPLICATION NO. : 11/094835
DATED : February 16, 2010
INVENTOR(S) : Jeff G. Wells It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 821 days.

Signed and Sealed this

Thirtieth Day of November, 2010

David J. Kappos
*Director of the United States Patent and Trademark Office*